United States Patent
Keane

(10) Patent No.: US 6,381,562 B2
(45) Date of Patent: *Apr. 30, 2002

(54) CONFIGURABLE BIO-TRANSPORT SYSTEM SIMULATOR

(76) Inventor: John A. Keane, 273 Jefferson Rd., Princeton, NJ (US) 08540

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/353,301

(22) Filed: Jul. 13, 1999

Related U.S. Application Data
(60) Provisional application No. 60/092,608, filed on Jul. 13, 1998.

(51) Int. Cl.[7] .............................................. G06N 3/00
(52) U.S. Cl. ................................ 703/11; 703/2; 703/9
(58) Field of Search .................. 703/11, 9, 2; 434/126, 434/262, 268, 272

(56) References Cited

U.S. PATENT DOCUMENTS 5,680,590 A * 10/1997 Parti ............................ 703/11
6,117,087 A * 9/2000 Kamm et al. ................ 600/504

OTHER PUBLICATIONS

Iyengar, S. ed. "Chapter 7—Computer Simulation in Cancer Research," Structuing Biological Systems: A Computer Modeling Approach, CRC Press, Inc. 1992, pp. 210–226.*

Ironi, L. et al. "A Framework for Building and Simulating Qualitative Models of Compartmental Systems," Computer Methods and Programs in Biomedicine, vol. 42, 1994, pp. 233–254.*

Hademenos, G. "The Biophysics of Stroke," American Scientist, vol. 85, No. 3, May/Jun. 1997, pp. 226–235.*

Aliev, M.K. et al. "VI–2 Mathematical Modeling of Intracellular Transport Processes and the Creatine Kinase Systems: A Probability Approach," Molecular and Cellular Biochemistry vol. 133 No. 134, Apr.–May 1994, pp. 333–346.*

Dijkstra, Jan et al. "Simulation of Nutrient Digestion, Absorption and Outflow in the Rumen: Model Description," The Journal of Nutrition, vol. 122, No. 11, Nov. 1992, pp. 2239–2256.*

Jensen, Klaus et al. "Self–Sustained Oscillations and Chaotic Behaviour in Kidnet Pressure Regulation," Laws of Nature and Juman Conduct, Proceedings of the of the Discoversies 1985 Symposium, Oct. 5–9, 1985, pp. 91–109.*

* cited by examiner

Primary Examiner—Kyle J. Choi
(74) Attorney, Agent, or Firm—Synnestvedt & Lechner LLP

(57) ABSTRACT

A method of simulating a bio-transport system comprising: (a) characterizing one or more elements to represent a bio-transport system of an organism or a portion thereof; (b) constructing one or more mathematical representations that model one or more bio-transport dynamics for each element based on the characterization of the elements to form a configured simulation model; (c) initializing the configured simulation model; (d) executing the configured simulation model to obtain bio-transport dynamics data for one or more elements; and (e) outputting information to a user based on at least a portion of the bio-transport dynamics data.

32 Claims, 11 Drawing Sheets

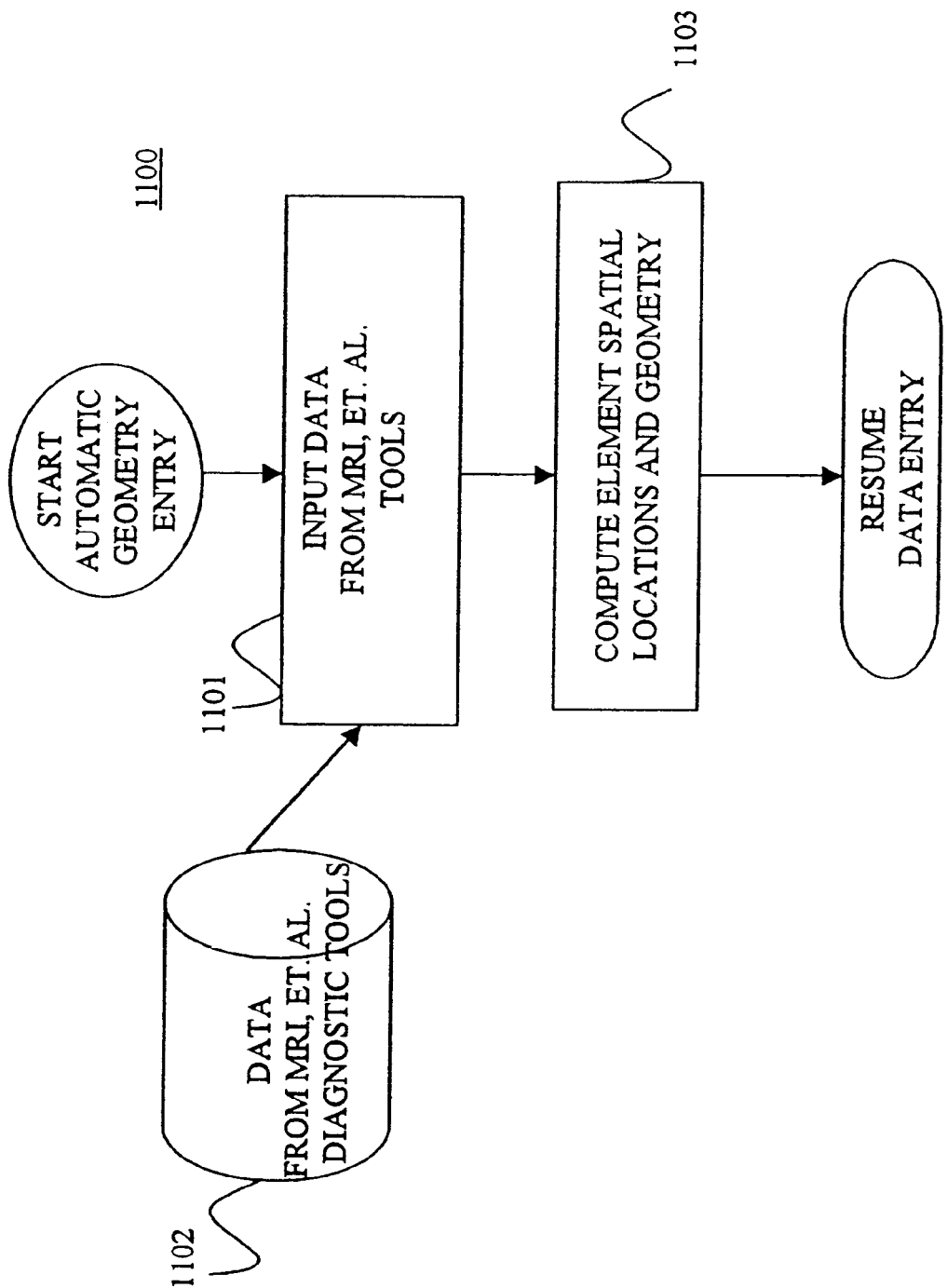

CONFIGURABLE BIO-TRANSPORT SYSTEM SIMULATOR

RELATED APPLICATION

This application is based on application Ser. No. 60/092,608, filed Jul. 13, 1998 entitled "Circulatory System Simulator."

FIELD OF INVENTION

This invention relates to a computer-based simulation model for simulating a transport system in an organism. More specifically, the present invention relates to a configurable simulation model that emulates the behavior of a circulatory system.

BACKGROUND OF THE INVENTION

Almost all organisms have systems for channeling or otherwise controlling the movement of mass and/or energy in or around the organism. These systems are referred to herein as "bio-transport systems" (BTS), and include, for example, circulatory systems, digestive (gastrointestinal) systems, pulmonary systems, lymphatic systems, renal systems, and the movement of chemical and biological entities within and among tissues and cells just to name a few.

One bio-transport system of particular interest herein is the circulatory system. The circulatory system channels blood and other entities through vessels and among the various organs to supply nutrients to tissues, to regulate body mechanisms, and to facilitate the flow of materials and interactions necessary in general to keep an organism alive. Additionally, the circulatory system contains a medium, that is, blood, in which various chemical, biological and physical reactions take place. Thus, the circulatory system is a complex system having geometric, physical and chemical/biological properties; flow behavior; internal reactions; and interactions among blood, vessels, connected organs, and the organism in general. The properties, configurations, behaviors, reactions and interactions of a bio-transport system are collectively referred to herein as "bio-transport dynamics" [BTD].

As medicine becomes more quantitative, there is a need for analytic tools to relate more precisely causes to effects in organisms and to more clearly elucidate the mechanisms involved. This requires obtaining bio-transport dynamic data. For example, in the pharmaceutical field, there is a need to evaluate the effects of chemicals in drug studies by computing and displaying the concentration, at different points in the circulatory system and as a function of time, of a chemical injected into the body at a point in time and space, or bio-availability of an orally ingested drug in its journey through the GI tract and the circulatory system to its final destination at an organ or other target within the body. Aside from pharmaceutical applications, there is a need for analyzing bio-transport dynamics for diagnostic purposes, such as, when assigning a quantitative measure to the degree of atherosclerosis present in an individual's specific circulatory system.

Despite the desire to analyze bio-transport dynamics of mass transport systems within organisms, the dynamic nature of these systems makes them inherently difficult to study. Conventional approaches of studying bio-transport dynamics of the circulatory system for example involve obtaining clinical measurements or images of the circulatory system in humans and animals. For example, blood pressure cuffs and direct pressure probes are used to measure flow rates and pressures, and ultrasound and angiography are used to image vessels of the circulatory system. These measurements and images are compared against norms to attempt to qualify an organism's status and to help locate anomalies. Some of these tools are non-invasive but imprecise, such as sphygmomanometer, while others are precise but invasive, and potentially life threatening, such as cardiac catheterization.

Animal testing is another approach for obtaining bio-transport dynamic data that traditionally has allowed for more invasive measurements. Animal testing, however, is under scrutiny. Political and social pressure against animal testing has become very strong and is expected to increase. For example, scientists now must seek approval from the FDA for every primate subjected to experimentation and must account for every rat used. Animal testing is being framed today in a broader ethical context, and is likely to become even more circumscribed in the future.

Given the limitations presented by in-vivo testing, a theoretical approach in analyzing bio-transport dynamics is attractive. There are a number of practical difficulties, however, associated with a pure theoretical analysis of bio-transport dynamics that are not normally encountered outside living organisms. Sir James Lighthill [Lighthill M. J. Mathematical Biofluiddynamics" SIAM Regional Conference Series in Applied Math. 1975] lists four broad categories:

1. Unusual vessel distensability and resultant attenuation of wave propagation;
2. Great range of Reynolds numbers >5000 to <100 with small capillaries <10 microns;
3. Atypical fluid properties; and
4. Branching in lungs and circulatory system [20–30 forkings leading to >100 m branches].

To this list should be added the historic difficulty of obtaining clinical experimental data as mentioned above to compare with theory.

Piecemeal solutions that arise from considering only part of a problem-, or a radical simplification of the problem to obtain an assumption-restricted solution, while useful within the stipulated range of applicability, do not meet current and future clinical/research needs for scope, detail, accuracy and architecture. For example, in Guyton, et. al. "Computer Analysis of Total Circulatory Function and of Cardiac Output Regulation", Chap. 17, Graphical, Algebraic and Computer Analyses 1973, a mathematical representation of the circulatory system is provided based on the system as a whole. Although such a model provides useful information on the circulatory system in gross terms, no detailed information with regard to spatial dependence of the system is available. In other words, this model can only provide data on bulk values for variables in the circulatory system and not for different components of the system where data tend to vary as suggested by Lighthill.

Therefore, a need exists for an approach that will enable researchers and physicians to experiment and practice with a bio-transport system without the attendant time constraints, risks and difficulties of dealing with a real bio-transport system in a living organism. The present invention fulfills this need among others.

SUMMARY OF INVENTION

The present invention provides an approach for analyzing bio-transport dynamics that overcomes the above-identified problems by simulating, in silico, a bio-transport system of an organism using a configurable simulation model. The configurable simulation model provides a generic framework that is readily customizable to simulate one or more bio-transport dynamics aspects of a user-defined bio-transport system as a function of both time and position within the system. More specifically, the present invention applies finite-element techniques along with first principles and empirical relationships to a bio-transport system to construct mathematical representations of one or more bio-transport dynamics in and around the bio-transport system based on user-characterized elements representing the bio-transport system. By using a finite-element approach, the bio-transport system can be compartmentalized to manage its intricacies and provide sophisticated bio-transport dynamic data not only as a function of time, but also as a function of the spatial position locating each element defined.

By combining a configurable finite element approach with modern techniques in computer programming and current computer architecture, the present invention creates a simulation model that affords the flexibility and scope needed to address many of the complexities outlined by Lighthill by offering one or more of the following functional capabilities:

(1) Configurable to provide detailed solutions as a function time and at least one space dimension (e.g. axial position along the blood vessels);
(2) Configurable to account for both nonlinear effects (e.g. vessel elasticity and/or conditions of state dependency) and non-Newtonian fluid behavior;
(3) Configurable to represent multi-level branching;
(4) Provides a platform that is readily extendable to cover (a) various bio-transport dynamics phenomena in a bio-transport system such as fluid behavior, chemical, biological, thermal and gravitational/inertial effects, (b) entities that interact with a bio-transport system such as organs and (c) physiological phenomena, effectuated via systems other than bio-transport systems [e.g. the central nervous system], which influence the bio-transport dynamics behavior of a bio-transport system;
(5) Offers an open architecture to permit concurrent, inter=operability with complementary models (e.g. existing organ models);
(6) Harmonizes with modern computer programming paradigms and infrastructure (e.g. with respect to parallel processing, object oriented programming and Imaging & Visualization); and
(7) Extensible to approximate continuity of time and space to any desired degree, within the constraints of computational power and storage access available.

The simulation model of the present invention enables a user to make decisions regarding the configuration of a bio-transport system and to see the effects of these decisions on a system's bio-transport dynamics, such as, for example, fluid flow rates, pressure gradients, chemical and biological concentrations and fluid temperatures, at various points in time and space. The simulator may be used as an instructional tool to illustrate, for example, the behavior of a representative circulatory system. Additionally, it may be used with respect to a specific bio-transport system as a planning guide to examine alternative strategies to correct problems, or as an experimental platform to elucidate mechanisms occurring in classes of circulatory systems for example. Since it is only a simulator, the user can learn, teach, plan, diagnose or experiment without risk to sentient organisms and in ways that are not ethically and/or technically possible with live organisms.

One aspect of the invention is a method of simulating bio-transport dynamics of a bio-transport system using the configurable simulation model. In practice, computer simulation of a bio-transport system involves two basic steps: (a) constructing a simulation model of a bio-transport system of an organism; and (b) simulating the behavior of the bio-transport system by running the simulation model on a computer. It should be obvious to those skilled in the art that the simulation model must be constructed before it can be run, and that, once constructed, it can be run repeatedly without being "reconstructed." Consequently, these steps may be performed jointly or individually.

In a preferred embodiment of the construction phase, a user defines and characterizes elements and one or more transported entities associated therewith to represent the initial state of one of the organism's bio-transport systems or a portion thereof. A transported entity may be, for example, fluid, energy, chemicals, and biologicals. The term "fluid" is used broadly herein and refers to any material capable of flowing and includes, but is not limited to, traditional fluids such as liquids and gases, plus mixtures, dispersions, suspensions or slurries of solid and viscoelastic materials. Examples of fluids include blood, food, and air.

Based on the characterization of the elements, one or more mathematical representations that model particular bio-transport dynamics are constructed for each element. This forms a configured bio-transport system simulation model which has a mathematical representation for particular bio-transport dynamics phenomena at each element of the bio-transport system being modeled. It is especially convenient to designate an object for each element in an object-oriented programming environment, although the present invention is not limited to object-orientated programming techniques.

In a preferred embodiment of the simulation phase, a conventional simulator uploads the configured simulation model, initial conditions are entered, and then the mathematical representations are executed by the simulator for a desired period of time to obtain bio-transport dynamics data at each element as a function of time.

The degree to which one defines and characterizes the elements representing the bio-transport system depends upon the bio-transport dynamics and the specificity desired which may be determined by one skilled in the art. Generally, an element is characterized in terms of its geometry and physical characteristics which may include, for example, shape, dimensions, orientation, elasticity, permeability and resistance to flow, just to name a few. The fluid associated with the element is characterized generally in terms of physical properties such as, for example, viscosity, heat capacity and density, just to name a few. In the preferred embodiment, the model is adapted to handle characteristics which are dependent on "conditions of state," meaning that the characteristics' values are dependent upon other conditions existent at a particular element. For example, viscosity may be dependent upon temperature of the element's associated fluid, and an element's dimensions may be dependent upon the pressure of the element's associated fluid. The term "associated fluid" as used herein refers to the fluid contained within an element at a particular point in time.

Rather than defining and characterizing an element only as a flow channel component in a bio-transport system, it may be preferable to define an element to include entities that are not only flow channel components of the bio-transport system but also may interact in a special way with the system, such as an organ or a tumor. An element characterized to represent such an entity would model it in an average or "bulk" manner such that detailed information with regard to spatial dependence within say an organ would not be available. Thus, for example, an organ may be modeled as an "organ element" and characterized generally with a certain resistance to flow and a certain volumetric capacity, which perhaps is altered by pressure. However, in addition to normal element properties, the organ element may have special properties, such as volumetric pumping rates in a heart organ element, or hormone production in the case of the hypothalamus to mention just a few.

In a preferred embodiment, certain data characterizing elements of a particular bio-transport system are automatically generated by an imaging device such as magnetic resonance imaging (MRI), Computer tomography (CT) or ultrasound. The data generated from these devices then are inputted into the simulation model to construct a simulation model having elements representing the imaged bio-transport system, said configuration possibly being manually adjusted to compensate for any limitations in a totally automated process. The structural arrangement of the computational code effecting this construction preferably is adapted to readily receive the standard format of the input data from the imaging device. Using data from imaging devices is particularly useful in clinical circumstances where the physician/surgeon needs to analyze the unique bio-transport system of a specific patient.

The mathematical constructs are based on known relationships between user-specified characteristics to provide a prediction of bio-transport dynamics. Most bio-transport dynamics are governed by established first principles and physical relationships, for example, conservation of mass, conservation of momentum, conservation of energy, constitutive equations and other empirical relationships. The simulation model uses these relationships along with the user-specified characteristics to calculate bio-transport dynamics aspects such as flow rates, concentrations and pressures at different points in the configured simulation model at different points in time. The results are dependent on how the simulator is configured by the user, so any number of different bio-transport systems may be modeled for different organisms or different parts thereof. It should be understood that the formulae presented herein are to predict behavior and interaction and are not intended to describe or theorize bio-transport dynamics. In other words, the invention does not depend on the theoretical merit of a particular equation providing that it predicts conditions as accurately and precisely as desired by at least one user. It is anticipated that alternative equations may be used to progressively improve the predictive ability and speed of convergence of the simulator as desired by other users.

The particular bio-transport dynamics modeled depend upon the user's preference although bio-transport simulations in one form or another generally model flow behavior since most bio-transport dynamics, such as dispersion of a chemical or biological component, relate to the fluid flow in the bio-transport system. In a preferred embodiment, to enhance realism and predictability, the simulation model further comprises one or more of the following bio-transport dynamics in addition to fluid behavior: (a) mass transport and reactions of chemicals and other entities, such as viruses, bacteria and clots, in the fluid; (b) heat transport in the fluid including its effects and Transport; (c) external dynamical and mechanical effects such as gravitational and inertial forces, and (d) interaction of elements/organs with other elements/organs that are effectuated by systems outside the bio-transport system under study [for example, effects at a distance produced by the central nervous system when the circulatory system is under study]. This last enhancement provides for user definition of mathematical relationships among variables to represent physiological interactions that exist within an organism, but are not effectuated by bio-transport mechanisms within the bio-transport system being simulated. In addition to modeling for these bio-transport dynamics, the simulator of the present invention may be enhanced with other models as applications dictate.

In a preferred embodiment, the simulation model has an open architecture to permit concurrent, interoperability with complementary models. Such a feature is particularly useful in enabling organ simulators to be networked to provide for more realistic simulations. Since organs are connected by the circulatory system, to model the behavior of an organ in situ, an organ simulator also should be able to simulate the circulatory system through which it communicates chemically and biologically with the rest of the organism and with certain extra-circulatory functional interactions, such as the central nervous system. In addition to providing a common platform to network organs, the simulation model of the present invention provides an open interface for interconnection among various organ models. This saves developers of organ simulators the effort of individually constructing an ancillary circulatory simulator with extra-circulatory functional interactions for each organ model. Additionally, groups of organ developers can leverage on one another's modeling efforts by jointly using the interface provided by the present invention over remote connections, such as the Internet. Thus, the simulation model of the present invention constitutes a global platform for collaborative research on physiological processes of organisms.

In addition to configuring the simulation model of the present invention as an inter-organ transport model, it may configured as an intra-organ, intra-tissue or intra-cell transport model. In other words, the configurability of the simulation model of the present invention also enables it to simulate fluid flow and transport within an organ, tissue or cell. With respect to organs, flow and transport phenomena underlie the basic behavior of many organs. At least one organ has already been modeled in a fashion to approximate a time-space continuum, for example, in Winslow, R. et.al "Simulating Cardiac Sinus and Atrial Network Dynamics on the Connection Machine" Physica D 64 pp281–298, 1993. Likewise, with respect to cells, Tomita, M. et.al. "E-CELL: Software Environment for Whole Cell Simulation" Bio. Mag. Keio 1996 describes an "E-CELL simulator" that emulates transcription, translation and other chemical reactions occurring in the cell. Cell modeling, as described in that paper, would be enhanced by the inclusion of fluid flow, chemical/biological and thermal transport phenomena and possibly dynamic effects. Instead of repeating the effort of creating a bio-transport simulator bound to a specific organ, tissue or cell model for each organ, tissue and cell respectively, the simulation model of the present invention, with its ability to be configured and its open architecture, can be used as the bio-transport simulator component in any organ, tissue or cell model, thereby relieving the model developer of the task of managing the bio-transport part of the organ, tissue or cell simulation. Thus, the bio-transport simulation model becomes a simple "bio-transport object" in a modem object-oriented programming environment, or its equivalent in a more-traditional programming environment. It is anticipated that the use of this bio-transport object will accelerate the development of new physiological models and leverage many existing ordinary differential equation [ODE] models of physiological processes by reducing the effort to incorporate true spatial representations using partial differential equations [PDE] into the models.

Another aspect of the invention involves an apparatus for simulating a bio-transport system. In a preferred embodiment, the apparatus comprises (a) a processor; (b) a user interface operatively connected to the processor for receiving input from and conveying output to a user; and (c) memory operatively connected to the processor and containing instructions for constructing and/or executing the simulation model as described above. Preferably, the user interface prompts the user in a logical fashion to define and characterize the elements to represent the transport system to the desired precision/accuracy. Additionally, the user interface preferably displays output in a natural fashion so that the user can intuitively interpret results, thereby reducing errors and increasing acceptability. To this end, it is preferable to employ a structural arrangement of computational code that harmonizes with the natural display of results.

Yet another aspect of the present invention is a computer-readable medium of instructions for enabling the system described above to construct and/or execute the simulation model as described above.

BRIEF DESCRIPTION OF THE DRAWINGS

The invention may best be understood by reference to the following description taken in conjunction with the accompanying drawings, wherein like reference numerals identify like elements, and wherein:

FIG. 11 shows a flow chart of the automatic input of the bio-transport system geometry and certain aspects of the initial state.

DETAILED DESCRIPTION OF THE PRESENT INVENTION AND PREFERRED EMBODIMENTS

Figure 1:
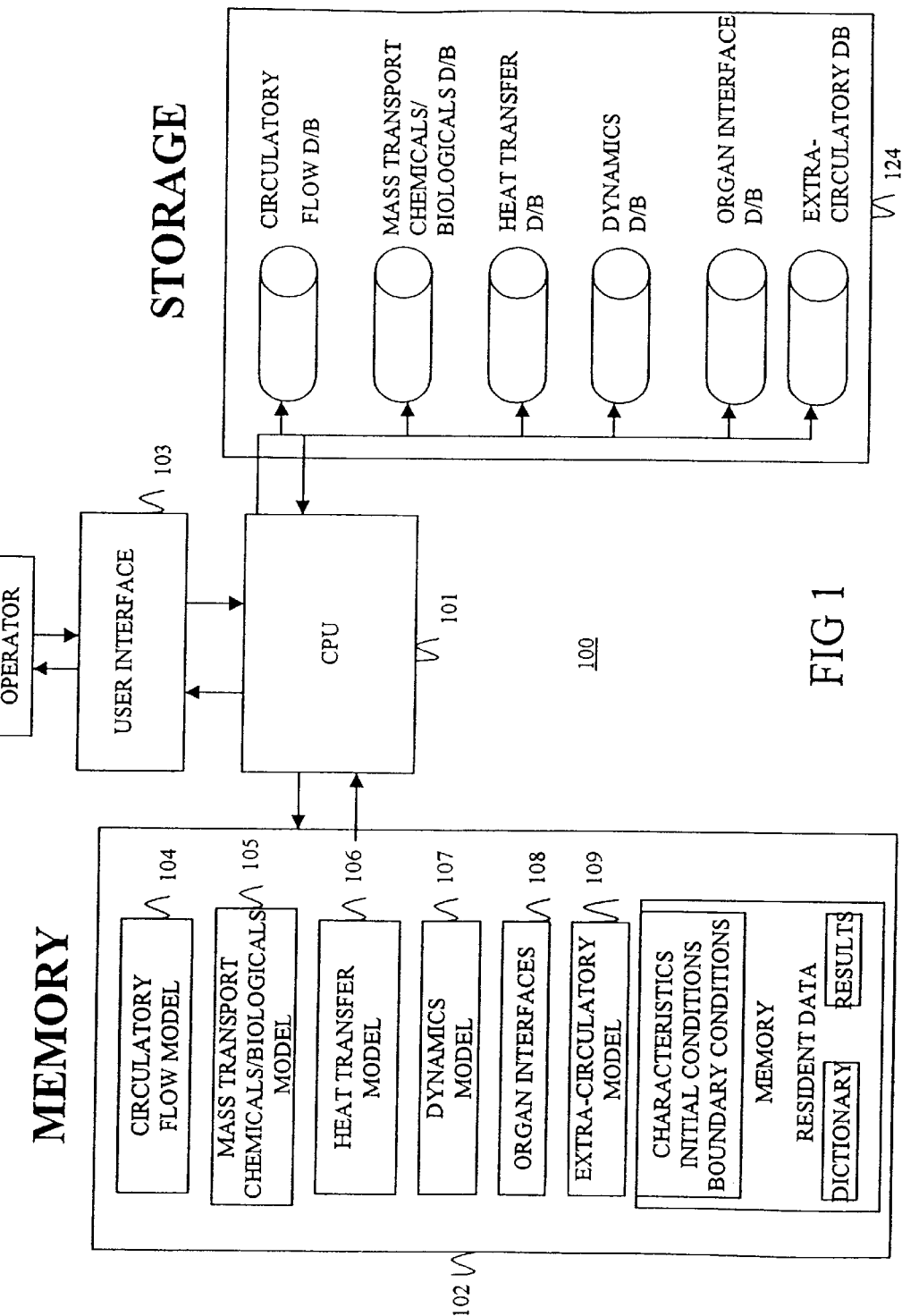
FIG. 1 shows a diagram of the present invention.

The present invention provides for a system and method for simulating bio-transport dynamics of a bio-transport system, using the configurable simulation model. More specifically, the invention may be practiced to simulate the transport of fluids, energy, materials, chemicals and biologicals in any bio-transport system, such as, for example, a circulatory system, a lymphatic system, a gastro-intestinal tract, channel arrays formed by tissue such as fluid flow channels in the kidney and heart, and nutrient intake and protein production transport inside and among cells. The particular bio-transport system modeled need not be confined to humans, but may include those found in animals, insects, plants, and bacteria or any other organism.

The present invention and preferred embodiments are discussed below with respect to (I) the Overall System, (II) the Overall Process, and (III) the Models. For illustrative purposes, the human circulatory system is described in detail herein using terminology consistent with that system such as vessels, organs and blood. Aside from being a familiar reference, the human circulatory system also is simplistic from the standpoint that it is a closed-loop system which is a function of time and essentially one spacial dimension. It should be understood, however, that the invention should not be construed as being limited to circulatory systems and other embodiments exist, including open-looped systems that are functions of time and multiple spacial relationships.

I. Overall System

The system 100 consists of a central processor unit 101, memory 102, and a user interface 103. The user interface may comprise traditional equipment such as a monitor and printer for displaying information for the user and a keyboard and mouse for entering information, as well as more exotic equipment such as scanners, voice recognition systems, touch screens, CT and MRI imaging devices for input and constructed output for MRI, CT and 3D graphics displays [e.g. 3D Virtuoso from Siemens]. It is anticipated that system 100 can be configured to accommodate any user interface both known and in the future.

The memory contains at least one model, such as a fluid flow model 104, labeled as Fluid Flow Model [FFM] and may possibly contain other models such as a chemicals and biologicals mass transport and reactions model 105, labeled as "Mass Transport Chemical/Biological Model [MTC/BM], a heat Transport model 106, labeled as Heat Transport Model [HTM], a dynamics and mechanics model 107, an interface 108 to detailed models of organs, and an Extra-Bio-transport model 109 containing a Relations Processing Engine [RPE] to process user defined relationships among elements/organs that are effectuated outside the bio-transport system under study. These simulator models [104. 105.106, 107 and 109] and the user input for the RPE have mathematical algorithms to simulate a bio-transport system and extra-bio-transport system relations.

The memory 102 also stores the resident data to enable the CPU 101 to construct and process the mathematical algorithms. In this disclosure, types of data are referred to, for example, as characteristics, properties, parameters, initial conditions, and boundary conditions. This terminology is adopted from common usage in continuum mechanics for illustrative purposes and should not be used to limit the scope of the invention. One skilled in the art will recognize that data, labeled as, for example, parameters, initial conditions and boundary conditions, could be grouped together under the generic heading of data.

The system 100 may be configured to allow processing to occur on more than one processor unit, and that the processing units need not reside on a single computer, nor must the CPUs reside at a single physical site. Once the CPU processes the information, the memory 102 stores the results. The system 100 may also include a data storage component 124 for storing information associated with the aforementioned models.

II. Overall Process

Figure 2:
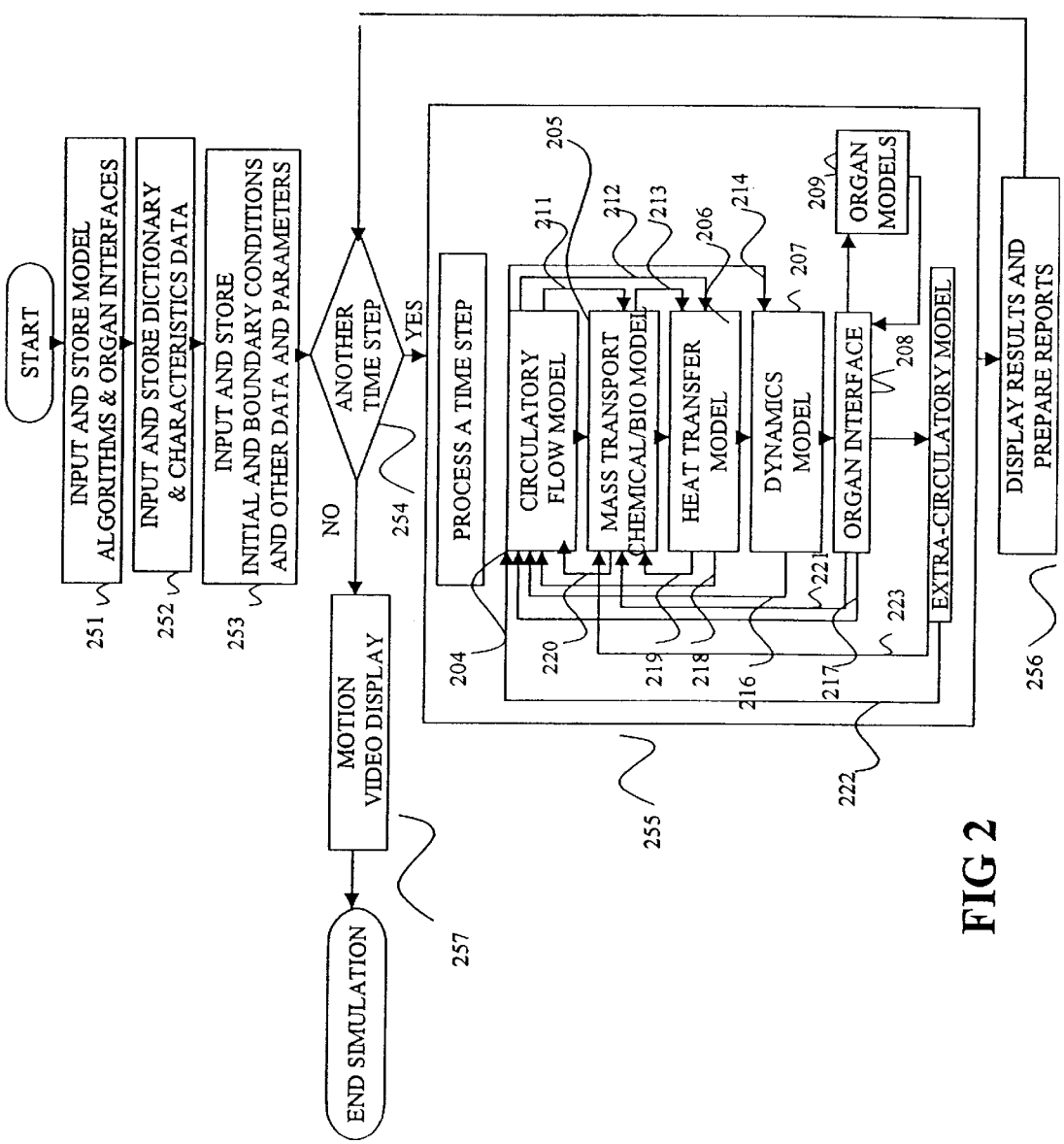
FIG. 2 shows overall flow chart of the invention's operations.

The overall process of the system is shown in FIG. 2. When a user starts the system 100, the various models are inputted according to Block 251 and stored in memory 102 such that the models are resident within the system 100.

Alternatively, certain models may be stored on disk or other information storage devices if the memory cannot accommodate all the models simultaneously. In this configuration, the CPU 101 would transfer models from the storage 124 to memory 102 if needed and return models back to the storage 124 when dormant. Such a function is well known in the art.

Next, dictionary data to identify components and data, such as the physical characteristics of the flow channel elements, the geometric connection of flow channel elements one to the other, the gross characteristics of organ elements, their geometries, and characteristics of the fluid are made resident in memory by block 252. These data customize the model to a particular organism's bio-transport system, or part thereof, rather than operating on a preset arbitrary model. Such data may be entered by the user contemporaneously with the program's operations, or it may be entered into data storage 124 prior to the program's operation and accessed as needed by the CPU 101. The data storage may be any data storage means such as disk, hard drive, or memory. If other than memory, the exchange of data between memory 102 and the data storage 124 would be controlled by the CPU 101 using known methods.

Automatic input of data from certain experimental/diagnostic tools reduces the tedious effort of manual inputting for example the geometry data associated with even simple Bio-Transport systems. It is anticipated that the CB-TSS will be used to aid in the diagnosis and correction of problems in individual Bio-Transport systems. For this to be practical, automatic entry of setup data for each specific Bio-Transport system is considered to be a requirement. In a preferred version, gray scale or color coding of, for example, image density produced by radioactive chemical concentrations further reduces the setup of certain CB-TSS models Referring to FIG. 11, the clinical results of an MRI [or other common diagnostic tool] are first stored on a storage device 1102 by the user. During the data input section of the CB-TSS, the user selects an option 315 directing the CB-TSS to use these data, instead of manual input, to construct the Bio-Transport system geometry. These data are read into memory 1101 and then, using the known format of the diagnostic tool and associated graphic detection algorithms, converts these data to the input format for the Bio-Transport system geometry.

The system 100 is finally initialized when data such as initial conditions of state, boundary conditions and other data and parameters are also made resident in memory 102 by block 253 to customize the model to an initial state. Parameters allow the simulator configuration to be quickly changed making it easy for the user to conduct parametric studies. Each of the models has its own parameters. An example of a parameter is organism size, where, for example, all dimensions are scaled in proportion to a size parameter. One skilled in the art will recognize that the functions of Blocks 251, 252 and 253 can be performed in any sequence. By initializing the simulator according to a particular set of data, characteristics, conditions of state and parameters it becomes customized for a particular bio-transport system in a particular initial state, enabling the computer system 100 to generate realistic and useful information on the behavior of that particular system over time.

Following the initialization of the simulator by Blocks 251, 252 and 253, Block 254 determines if another time step should be run. If not, the process ends. If another time step should be run, then the various models are executed for another time step in Block 255, and the results of the simulation are displayed in Block 256.

The user can display snapshots of the simulator state [e.g., pressures, flow rates, chemical concentrations at each of the element locations]. These displays are graphical as well as tabular.

Figure 10:
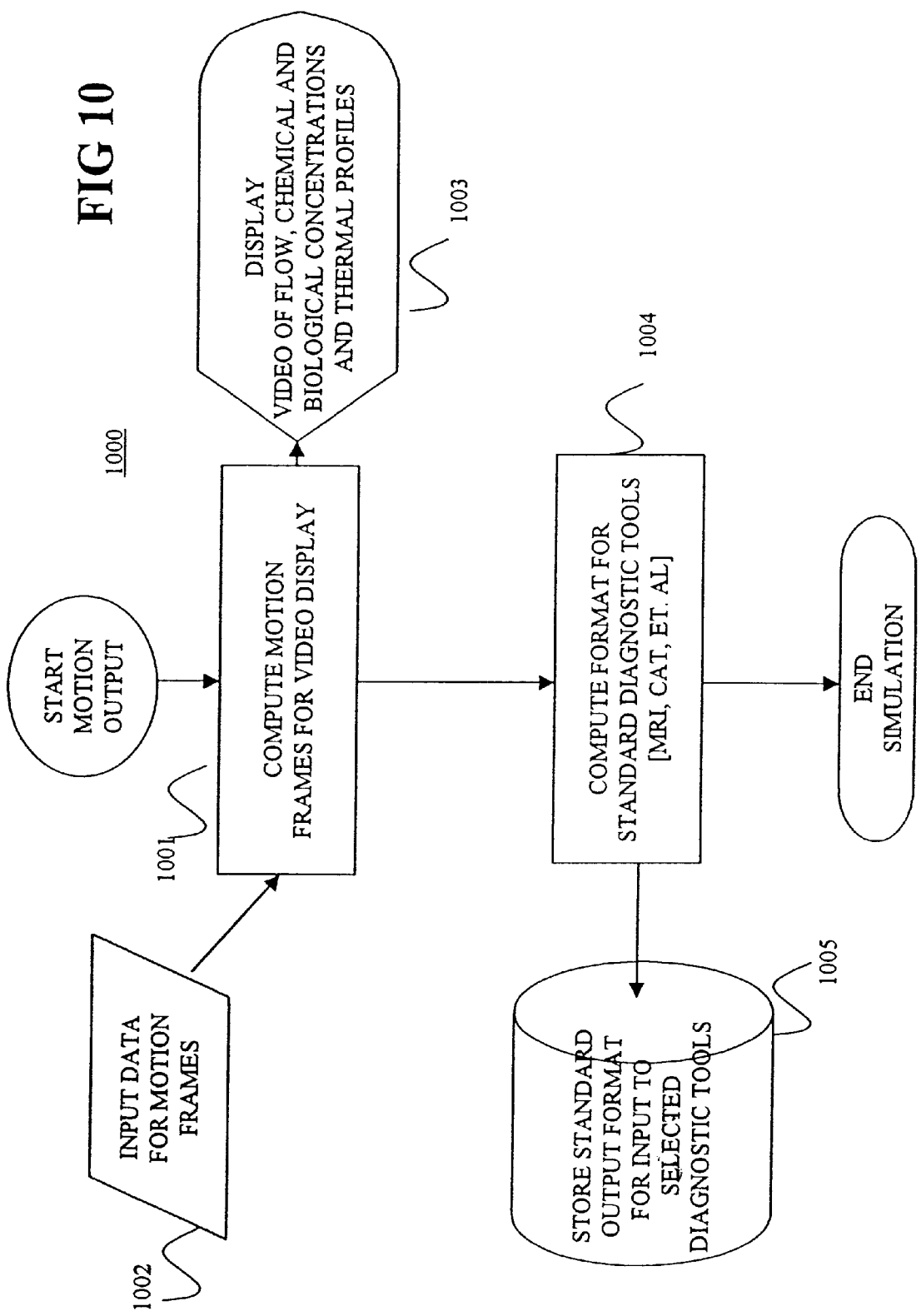
FIG. 10 shows a flow chart of motion video output of the configurable bio-transport system simulator results.

In a preferred embodiment, the results of state conditions for the respective models are saved with a periodicity determined by the user. Referring to FIG. 10, after all time steps are processed, these data are supplied by Block 1002 to Block 1001 where they are assembled into a series of graphics images which are sequentially presented on a displaying unit 1003 creating the effect of an animated motion video. A number of different displays are possible. For example, the CB-TSS geometry of the circulatory system under study can be drawn and the concentration of a chemical at each element location superimposed thereon, using color-coding or a grey scale, for each time step. The result is a motion video of the dispersion of the chemical through the circulatory system over time. It is also possible to create a CB-TSS view from the prospective of an observer traveling with the fluid through the Bio-Transport system. The technology to save and assemble the data into a graphical display is well known.

It is anticipated that the timing and other aspects of the graphics images will be altered to enhance the effect of the display for certain teaching purposes. This usage is termed a stylized animation of the simulation, wherein the relation to actual physics is distorted, compared with an unaltered view or series of images of a simulation as described above. It is anticipated that such animations will be constructed using computer executed algorithms to construct the desired stylized series of images of the physical phenomena. Although such simulations of the Bio-Transport system, or parts thereof, may not be based on first principles and physical laws, the result is a simulation, distorted or otherwise of the Bio-Transport system and is therefore a B-TSS as a subset of CB-TSS. Such imaginative constructions are anticipated and thus covered by this teaching.

In a preferred embodiment the output of the Bio-Transport system simulator is reformatted to serve as data input for a variety of diagnostic and experimental tools such as MRI. For example, instead of the display component of an MRI system using processed signals originating in the sensing device to form a graphic display, it would use similarly formatted data constructed by the output component 1004 of the CB-TSS to create a disk file 1005 which is then used as input for an MRI, et. al. display. The user of the MRI equipment would see what appears to be a MRI of the organism's actual Bio-Transport system. This mode of output has the advantage of familiarity to current users of these important experimental and diagnostic tools.

III. Models

The construction/initialization of one or more models in Blocks 251–253 is considered in greater detail in this section. The models are described generally in the first section (1. Models Generally), and then more specifically with respect to each model in the second section, (2. Detailed Description of Models).

1. Models Generally

In a preferred embodiment, the Fluid Flow Model 204 is configured by a user. In Block 252, the user inputs a selection of flow channel elements and organ elements, collectively referred to as elements, together with their respective characteristics such as initial and final diameter, length, elasticity, permeability and convection coefficients, volume of associated interstitial space, as well as fluid characteristics. Fluid characteristic may include, for example, general properties, such as temperature, pressure, and viscosity, as well as the identification, concentration and interactions of its components, which, in the case of blood, may include, plasma, blood cells, enzymes, hormones, proteins, amino acids and other chemical elements and compounds, viruses, bacteria, macrophages, t cells and other products of the immune system, parasites, clots and other biological entities. Certain data, such as the diameter of a flow channel element, may depend on state conditions of the element and associated fluid, such as pressure and concentration of certain chemicals in the associated, or may depend on the state of external influences, such as a central nervous system. In a preferred embodiment, the user can specify such relationships and the model incorporates the relationships in the overall set of algorithms to be executed.

Also associated with each element is a mathematical relationship within the Fluid Flow Model describing the behavior of the associated fluid. When the user selects a specific element and specifies its characteristics, this mathematical relationship is constructed. Hence the configured Fluid Flow Model comprises a selection of a set of mathematical relationships representing the fluid behavior within the Fluid Flow Model.

The driving force for fluid motion is traced back to a prime mover, for example, the pumping action of the heart, or to boundary conditions at "input/output" elements which may be used if the simulator is configured to represent part of a circulatory system, for example, a region of microcirculation. These prime mover functions are modeled by special elements whose characteristics allow the user to specify data that describe mathematical relations for the pressure increment and flow as a function of time at the special element location. In one preferred embodiment, these relations are not explicit functions of time, but rather depend on the state of the special element as well as time. It is anticipated that other types of prime mover representations and other types of special elements will be included in future embodiments of the simulator.

Next the relationships are combined together and solved simultaneously to determine the flow performance of the bio-transport system. Means to solve sets of simultaneous equations by computer are well known in the art. At the end of an incremental time period, the user receives the results of the solution process for that point in time 256. The information may be output through the user interface as either a monitor display or a printout. Optionally, the output may be omitted for certain time periods.

The basic Fluid Flow Model may be augmented with other models to more realistically emulate the operation of an actual bio-transport system. Like the Fluid Flow Model 204, these models are resident in the memory 102 of the computer 100, or are brought into memory by the processor 101 from storage 124 as needed. To account for concentrations of chemicals and biologicals within the bio-transport system, the Mass Transport Chemical/Biological Model 205 may be employed. This model 205 accounts for the mass transport within the vessels and organs, flow across porous/semi-permeable vessel and organ walls of chemical elements, compounds, including drugs proteins and enzymes, and changes in mass brought about by chemicals/biologicals reactions. As well, mass transport within the vessels and organs and cross-wall movement of other entities such as viruses and bacteria, [collectively referred to as biologicals] and reactions thereof can be modeled. In a preferred embodiment, chemical and biological reactions and reaction rates within the bio-transport fluid, within organs and at element walls are included. Like the Fluid Flow Model 204, the MTC/BM 205 requires the user to input data regarding, for example, initial conditions and boundary conditions. In the preferred embodiment, mathematical descriptions of chemical and biological reactions and reaction rates can be included as part of the data for MTC/BM 205. By applying the flow rate results 211 of the current time step of the Fluid Flow Model and the reaction relations to the MTC/BM concentrations of the previous time step, the concentrations of the current time step for MTC/BM can be computed.

Supplementing the bio-transport simulator with a Heat Transport Model 206 adds further realism, accuracy and predictive ability to the simulation. The HTM 206 emulates the flow of thermal energy through mass transport, conduction, convection and generation. Like the Fluid Flow Model 204, HTM 206 requires the user to input data regarding the initial and boundary conditions. Mathematical relations regarding the flow of heat involved are applied at each element. These relations are well known to those skilled in the art. By applying the flow rate results 212 of the current time step for the Fluid Flow Model to the HTM temperatures from the previous time step, the temperatures of the current time step at each of the elements can be computed. By including the heat generated from chemical and biological reactions 213 temperatures at each of the elements for the time step can be computed to a higher degree of conformance to reality.

Including a Dynamics Model 207 as part of the bio-transport system simulator enables a user to account for certain external effects such as gravitational attraction and acceleration resulting from rotational and translational motion of the organism. This increases the realism of the simulator and is especially important in situations where a reduction or increase of pressure could be life threatening, for example, where there is a risk of an aneurism or where a pilot may blackout during turning and banking. The effect of the Dynamic Model [DM] on the pressure gradients in the flow model is applied through pressure gradient adjustments 216 for the next time step. While chemical and biological reaction rates are a condition of state [for example, pressure and temperature] direct external dynamic effects on the MTC/BM model are omitted in this embodiment, except as reflected through pressure adjustments to the Fluid Flow Model as explained above. Heat convection can be markedly altered by pressure [e.g. nascent boiling]. Again, as explained above, the DM influences pressure gradients in the Fluid Flow Model which, in turn, are applied 212 to the heat Transport model. The unit flows and other results of the Fluid Flow Model are made available 214 to the Dynamics Model. This enables one to account for the changing of direction of a moving fluid. Inclusion of a DM 207 provides the opportunity to study possible effects of external forces on processes within the organism and perhaps uncover new mechanisms or explain current anomalies regarding the effect of these external forces on organisms.

The configurable bio-transport system simulator (CB-TSS) has the internal ability to represent organs in an average, "gross" or "lumped" manner. Organs are modeled as organ elements with, for example, a certain resistance to flow and a certain volumetric capacity, which may be a condition of state. Because the organ is represented in lumped fashion, however, no detailed information with regard to spatial dependence within the organ is available.

To expand the realism of the CB-TSS, in a preferred embodiment, the present invention facilitates the incorporation of an organ model 209. There are a variety of spatially detailed computer models of human organs that exist today [Winslow 1993] and it is anticipated that many computer models of organs as functions of 1-, 2-, or 3-Dimensions and time will develop in the future. Preferably, a organ interface 208, in the form of an object, is used for mathematically/ algorithmically coupling the Configurable Bio-Transport System Simulator to the organ model 209. The organ interface 208 supplies the detailed organ model 209 with input representing the current time step conditions created by the CB-TSS at the organ/simulator interface [e.g. inlet and outlet flow ports of the organ]. After the detailed computer organ model 209 is processed through the current time step, the organ interface 208 converts the results of the organ detailed models into organ element gross characteristics such as resistance to flow and volumetric capacity based on boundary conditions between the models at the current time step. This allows the CB-TSS to operate as if an organ element, with certain gross characteristics, were in place.

The technology to transmit and receive data between two processes operating on a computer is well known. Obviously there must be agreement between the organ model and the CB-TSS interface with respect to, for example, format and protocol. Standard interfaces would facilitate open interconnectiveity. In a single CPU environment, the computational load of the various detailed organ models may restrict the fineness of structure possible for the Bio-Transport system simulator. However, in a parallel processing environment, certain processors can be assigned to various detailed organs models without appreciable loss in detail or time required to obtain a solution for the CB-TSS. It is anticipated that network communications speeds will increase so that the detailed organ models will be able to reside on server computers in remote locations. The technology to transmit and receive data between two processes operating on separate computers connected by a network is well known [e.g. CORBA and COM/DCOM]. While the organ interface is described in this embodiment as a serial process to aid in learning, other, non-serial arrangements are within the scope of the invention.

The present embodiment of the CB-TSS can be configured to include an Input Element or an Output Element to model, for example, the injection of a drug into the circulatory system or the removal of a sample of matter from the interior of a circulatory system. This feature may be employed by users to model segments of a circulatory system, i.e. an open set of elements and organs terminated at its ends by Input/Output Elements having specified boundary conditions, e.g. flow rates. This leads to an obvious extension wherein several CB-TSS are used, each to model in detail individual components of a total Bio-Transport System, such as, microcirculation fields, the lymphatic system, the kidneys and the GI tract. These detailed components are in turn incorporated as organ objects in a CB-TSS model of a complete Bio-Transport System. In addition to being able to study a segment of a Bio-Transport system, or an organ such as the GI tract in detail, advantages in terms speed of convergence are anticipated by dividing a larger simulation into a set of smaller simulations coupled at discrete interface points.

Inclusion of an Extra-Bio-Transport Modeling [EBTM] ability as part of the CB-TSS enables a user to specify mathematical relations among variables that model interactions among certain parts/components of an actual organism through mechanisms external to the Bio-Transport System under study. The underlying mechanisms external to the Bio-Transport System under study may be other Bio-Transport Systems. To help illustrate the distinction between what may be modeled in a "system under study" and in the EBTM, consider the brain. The brain may respond to certain chemical/biological concentrations in its neighborhood by producing certain chemical/biological products in its neighborhood. These products can enter the circulatory Bio-Transport System directly and are so distributed. This can be accounted for in the system under study. On the other hand, the brain also responds to certain chemical/biological concentrations in its neighborhood and/or in other remote locales by producing/receiving electrical signals to and from these remote locales via the central nervous system [CNS]. In this way, CNS signals can effect reactions in locales remote to the brain. These CNS signals can be said to "produce an effect at a distance." Instead of trying to model the CNS in detail, the EBTM makes it possible to represent this behavior as a set of functional relations expressing how some condition in one part of the Bio-Transport System under study affects conditions in another part of the Bio-Transport System under study. While CNS effects illustrate one application of this EBTM, there are many other physiological phenomena that can be modeled in this fashion and employment of this CNS example should not be used to limit the scope of such a generic modeling capability or the scope of this invention.

To accommodate representation of such phenomena, the user is provided with an ability to specify a matrix of such "effects at a distance" which is processed by a Relations Processing Engine RPE of a generic type. This EBTM functionality may be used to model interactions among organs for example, even when these interactions are effectuated by fluid flow and/or other bio-transport dynamics. For example, one may wish to model the human heart and simulate its connection to the circulatory system and interactions with other organs by using just the EBTM and its user specified input as an expedient. In effect, the EBTM by itself would act as a CB-TSS. Using the EBTM, spacial separation effects are represented by time delays, yielding a faster bio-transport system simulation at the expense of spacial detail. Methods to create an RPE to solve sets of equations/relations with time delays and nonlinear terms are well known, and commercial RPEs are available. Hence, the EBTM by itself is a novel, useful simulator for modeling bio-transport phenomena in organisms under certain circumstances.

In a preferred embodiment, the heat Transport model 206 passes temperatures back 218 to the Fluid Flow Model to permit adjustment of temperature dependent characteristics such as fluid viscosity for the next time step. The HTM 206 also passes temperatures back 219 to the chemical/biological model 205 to permit adjustment of temperature dependent data such as reaction rates. The MTC/BM 205 passes back 220 chemical concentrations to the Fluid Flow Model to permit adjustment of chemical concentration dependent data such as channel wall elasticity and porosity/permeability. The Organ Interface passes effects of organ objects back to both the Fluid Flow Model via 217 and the MTC/BM via 221, as does the Extra-Bio-Transport Model via 222 and 223 respectively. For one skilled in the art, it can be seen that the order in which one chooses to compute the results of the various models within the CB-TSS affects the results and computational efficiency. For example, in an organism with a relatively stable temperature profile and little in the way of external forces/accelerations, computing the Fluid Flow Model appears to be most appropriate. If on the other hand, the user was interested in simulating the bio-transport system under conditions which affected other bio-transport dynamics more than those represented by the Fluid Flow Model, then the models representing the other bio-transport dynamics should be a higher computational priority. Optimal ordering for computing the various models would be ascertainable to one of ordinary skill in the art. Additionally, one skilled in the art would be aware that there are computational techniques available that allow one, under a broad set of circumstances, to iterate among models to that extent necessary to obtain a specified degree of accuracy, reducing or eliminating the need for considering the effect of computational order on the results of the simulation. Computational speeds available today, even from parallel CPU configurations, would likely limit such iterative approaches for certain problems that require a high degree of accuracy and a very fine mesh size. It is anticipated these limitations will be relaxed in the future.

2. Detailed Descriptions of the Models

The models will now be explained in detail with reference to FIGS. 3–9. These figures show flow charts representing the process of each model as well as the interactions among the models. In the depicted embodiment, models' couplings are centered around the Fluid Flow Model. This is to say the data input, programming logic flow, data transmission and model interaction generally follow the fluid flow. This explanatory approach is chosen to enhance the clarity of teaching. It also makes practical sense to use such a scheme to illustrate the CB-TSS since fluid flow is often a major transport mechanism for many Bio-Transport system phenomena. It should be understood, however, that other arrangements are possible and this choice should not be construed to limit the scope of the invention. Moreover, throughout this disclosure certain relationships are presented in the BASIC computer language, or in subscript notation for compactness in writing. The subscript convention adopted herein also enables one to use a single term to denote both, a mathematical relationship and its counterpart in a computer program. This mapping is typically one to one onto from physical equations to computer algorithms particularly in "scientific" computer languages and is intended to enhance the clarity of the teaching. Again, it should be understood that the procedural aspects of the algorithms could be implemented in any number of different computer languages including, but not limited to, 4g1 languages. Furthermore, other logically equivalent computer algorithms could be used to effect the same result.

Furthermore, one skilled in the art will realize that in contemporary programming nomenclature elements with a set of characteristics can be represented as objects with a set of properties. This is the preferred implementation of the present invention. The selection of the term "element" goes back to the development of "finite element" approaches to set up and solve certain classes of physical problems. As such, it would be more familiar to those in the physical sciences than the term "object." The terminology and methodology chosen to explain and implement the logic on a particular machine is for illustrative purposes, like the code, and should not be construed to limit the scope of the invention.

In the teaching that follows, physical laws are applied to materials such as blood which are assumed to be homogenous down to whatever scale one chooses to impose, while still being able to account for spatial and temporal variation using variables that are continuous in the mathematical sense. Such a hypothesis is commonly used as a starting point in continuum mechanics. It seems reasonable to apply this assumption to the flow of materials in a Bio-Transport system when a component such as blood is viewed without magnification, but can be questioned as the magnification is increased. It turns out that such modeling has proven to be remarkably robust in predictive ability, even at a scale that is obviously heterogeneous on a small scale and somewhat discontinuous. Nevertheless, there is a point at which the behavior of individual components creates differences between the homogenous/continuous model predictions and reality. Accordingly, the simulator may be expanded to include the ability to account for certain of these realities by including, for example, monte carlo modeling techniques to extend the usefulness of the CB-TSS into this realm where the stochastic nature of certain biological phenomena are important.

a. Fluid Flow Model.

Figure 3:
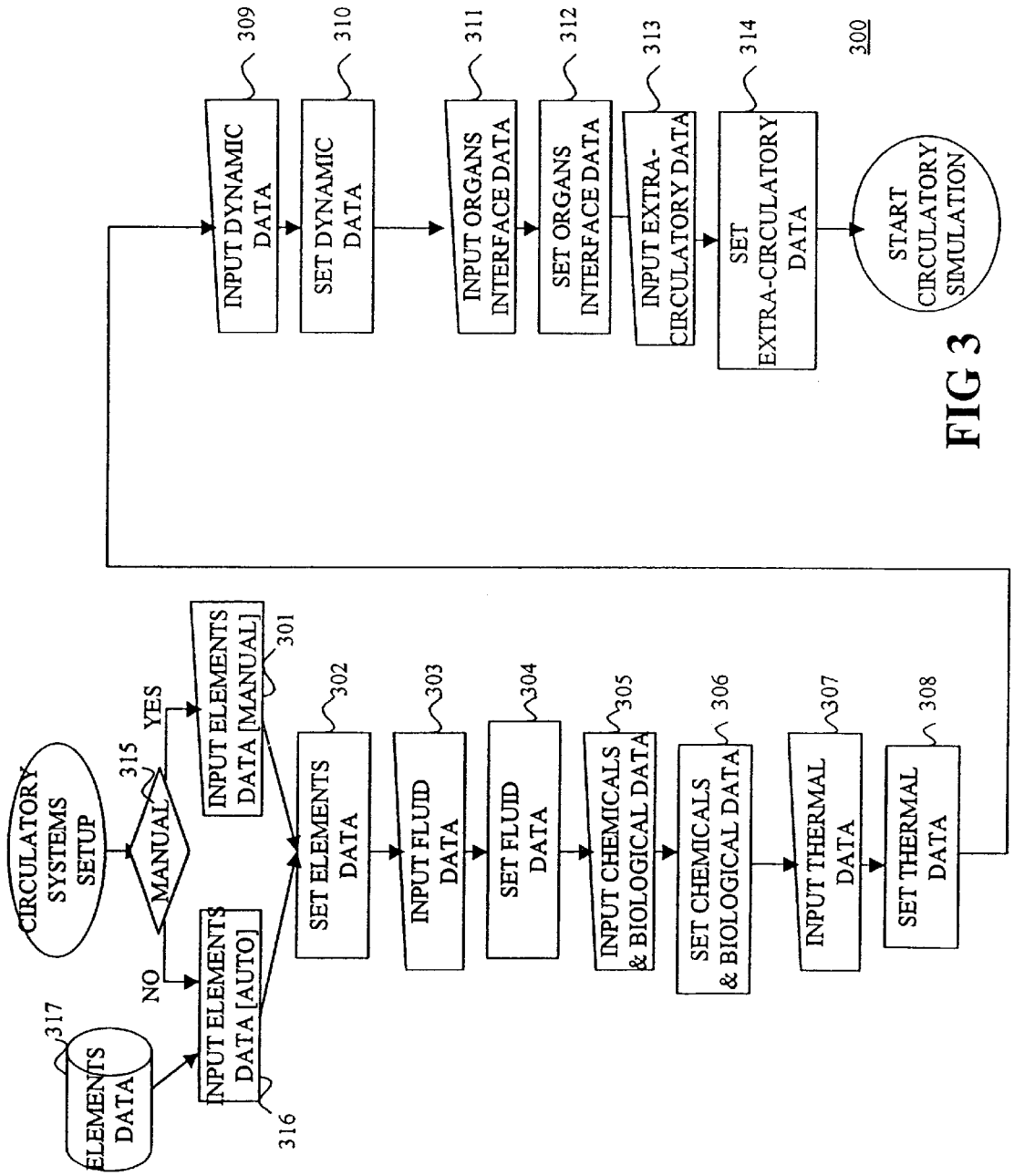
FIG. 3 shows a flow chart of the configuration of the bio-transport system model.

FIG. 3 shows the entry of data regarding element and fluid characteristics, initial conditions, boundary conditions, material properties and other information, generically labeled as data in FIG. 3, for the various models in this embodiment. In this embodiment, an option is provided 315 to the user allowing element data to be entered either manually 301 or automatically 316 from the output of diagnostic equipment such as MRI machines. Data are entered in the order the models are explained [301 for the Fluid Flow Model to 313 for the Extra-Bio-Transport Model]. One skilled in the art will realize that the order used for data entry is not material.

Figure 4:
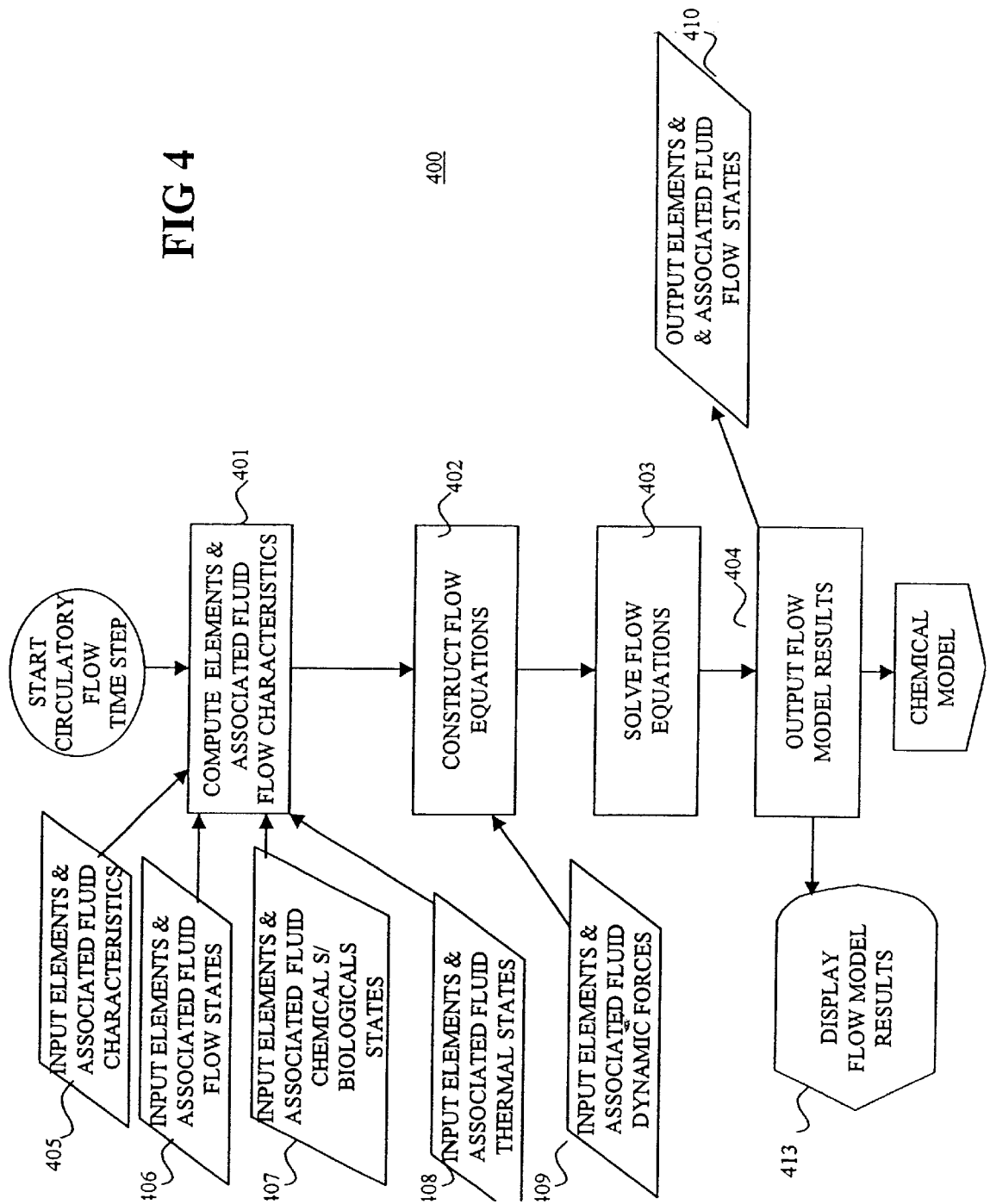
FIG. 4 shows a flow chart of the fluid flow model.
Figure 5:
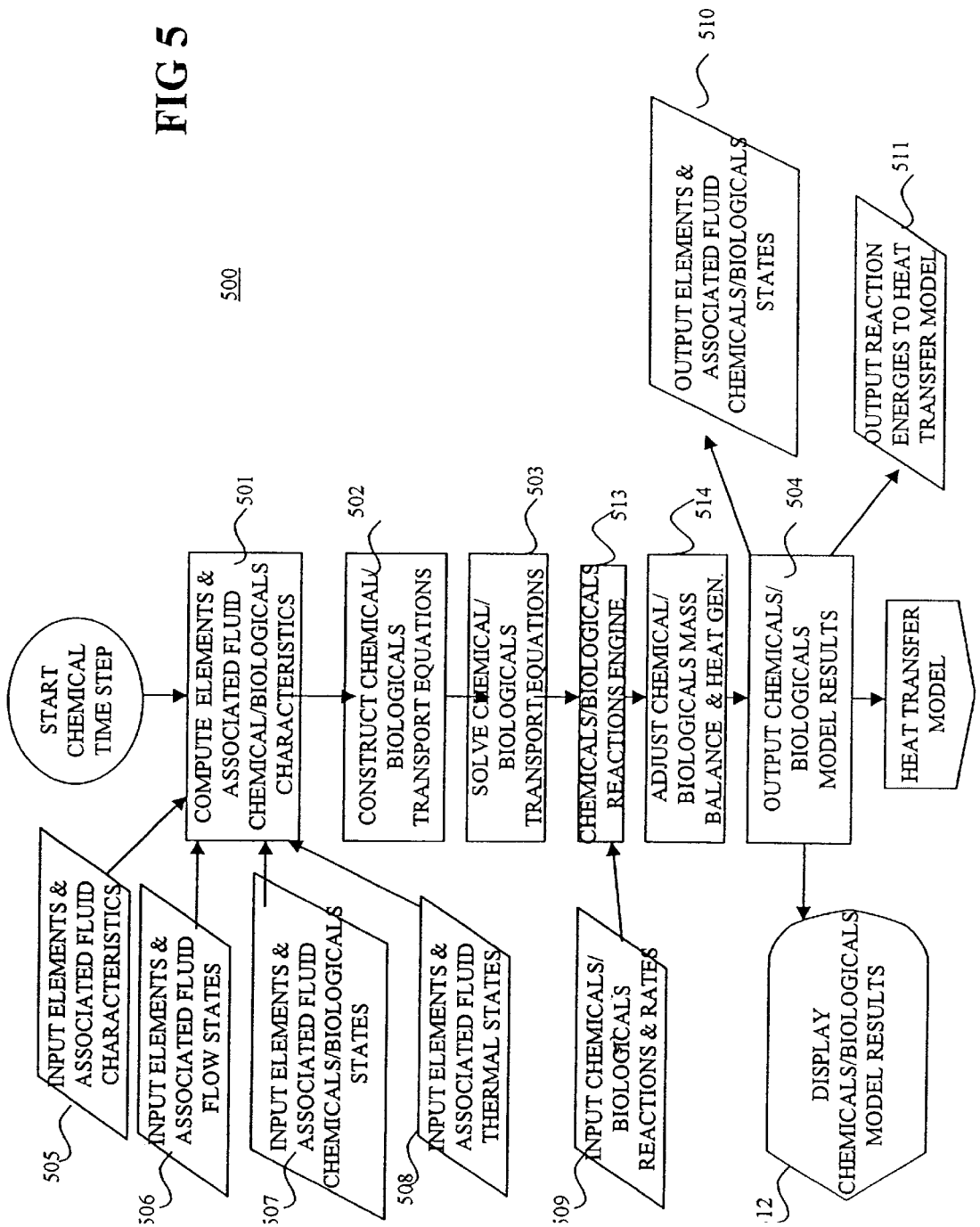
FIG. 5 shows a flow chart of the mass transport chemical/biological model.
Figure 6:
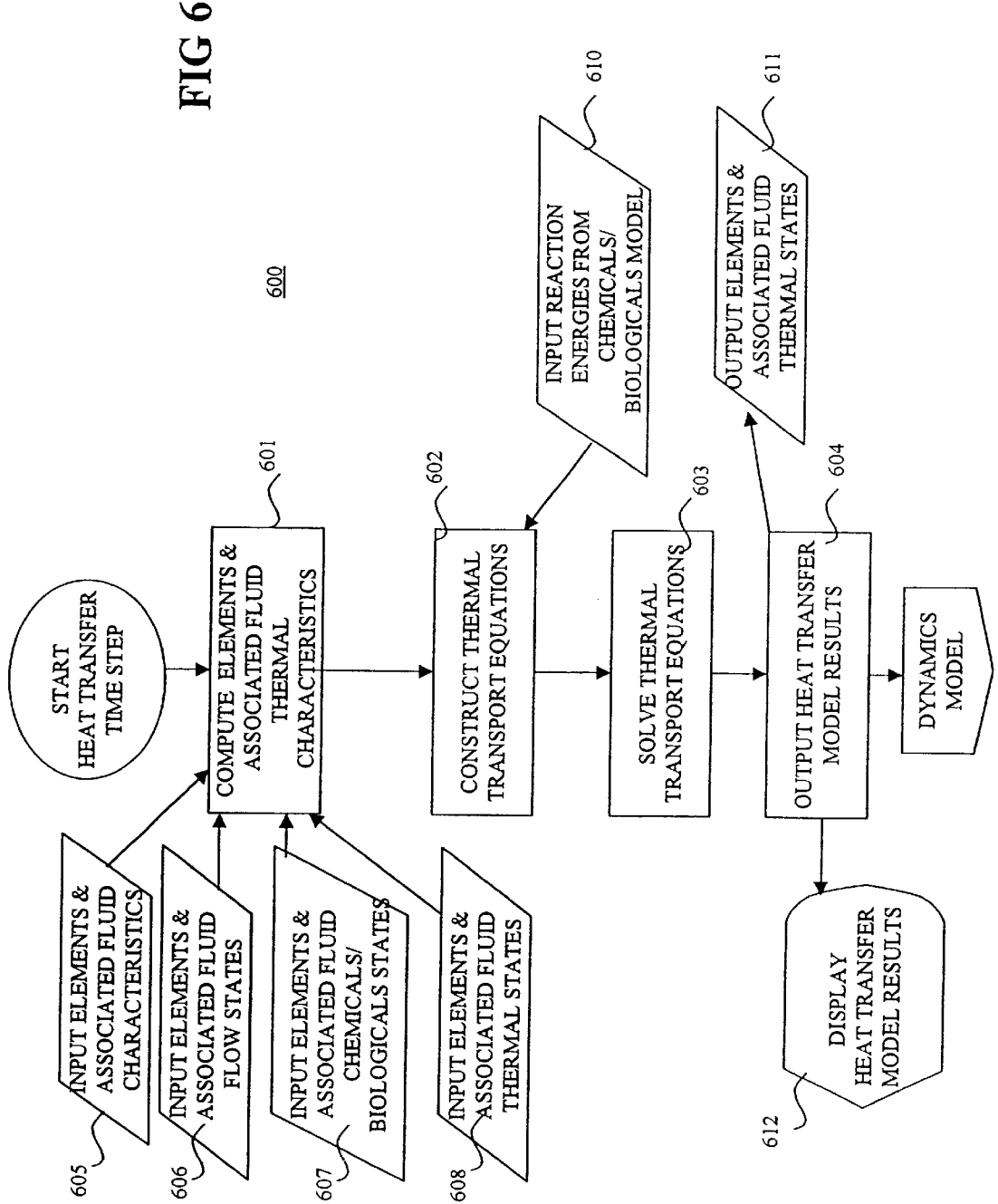
FIG. 6 shows a flow chart of the heat transport model.
Figure 7:
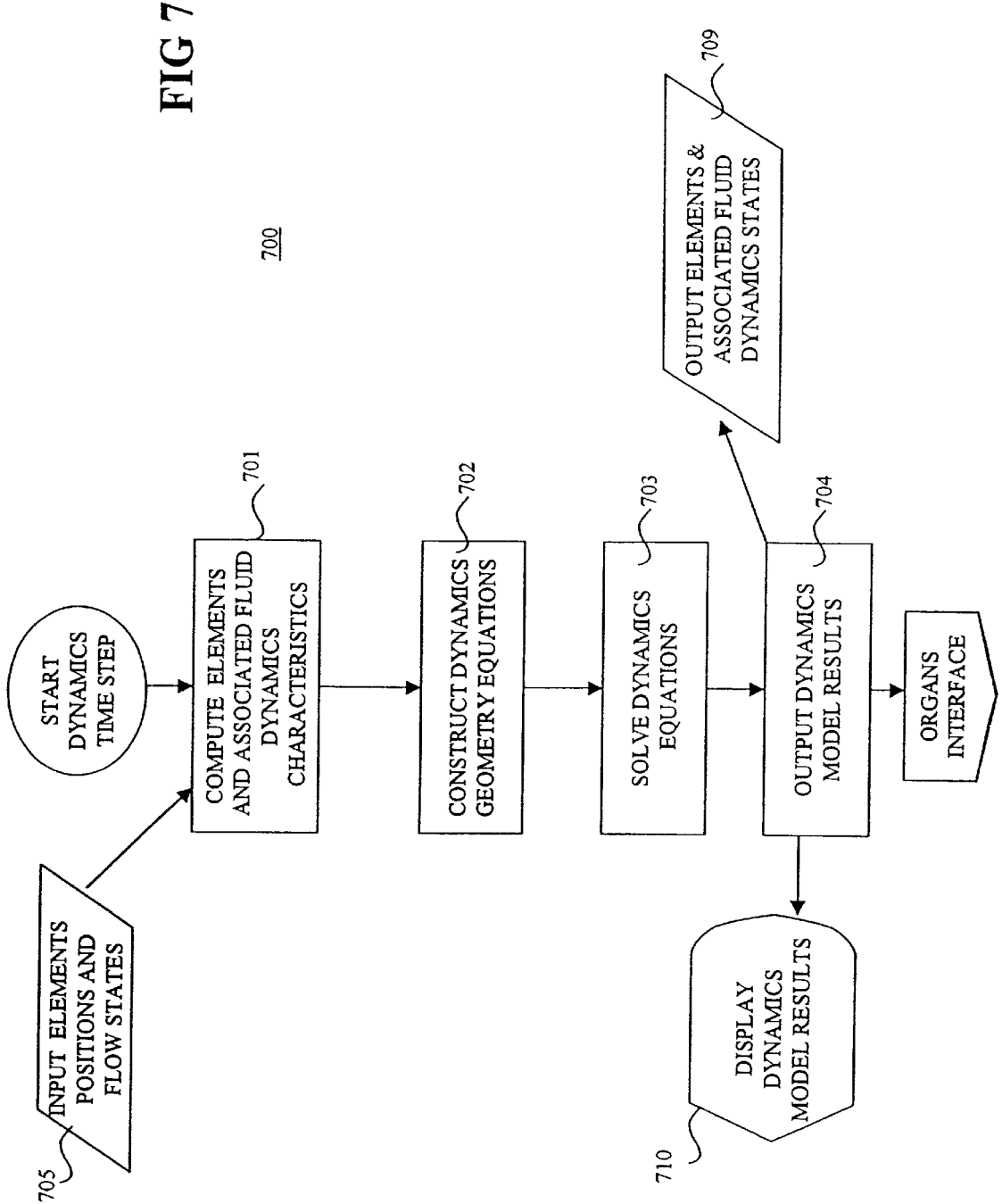
FIG. 7 shows a flow chart of the dynamics and mechanics model.
Figure 8:
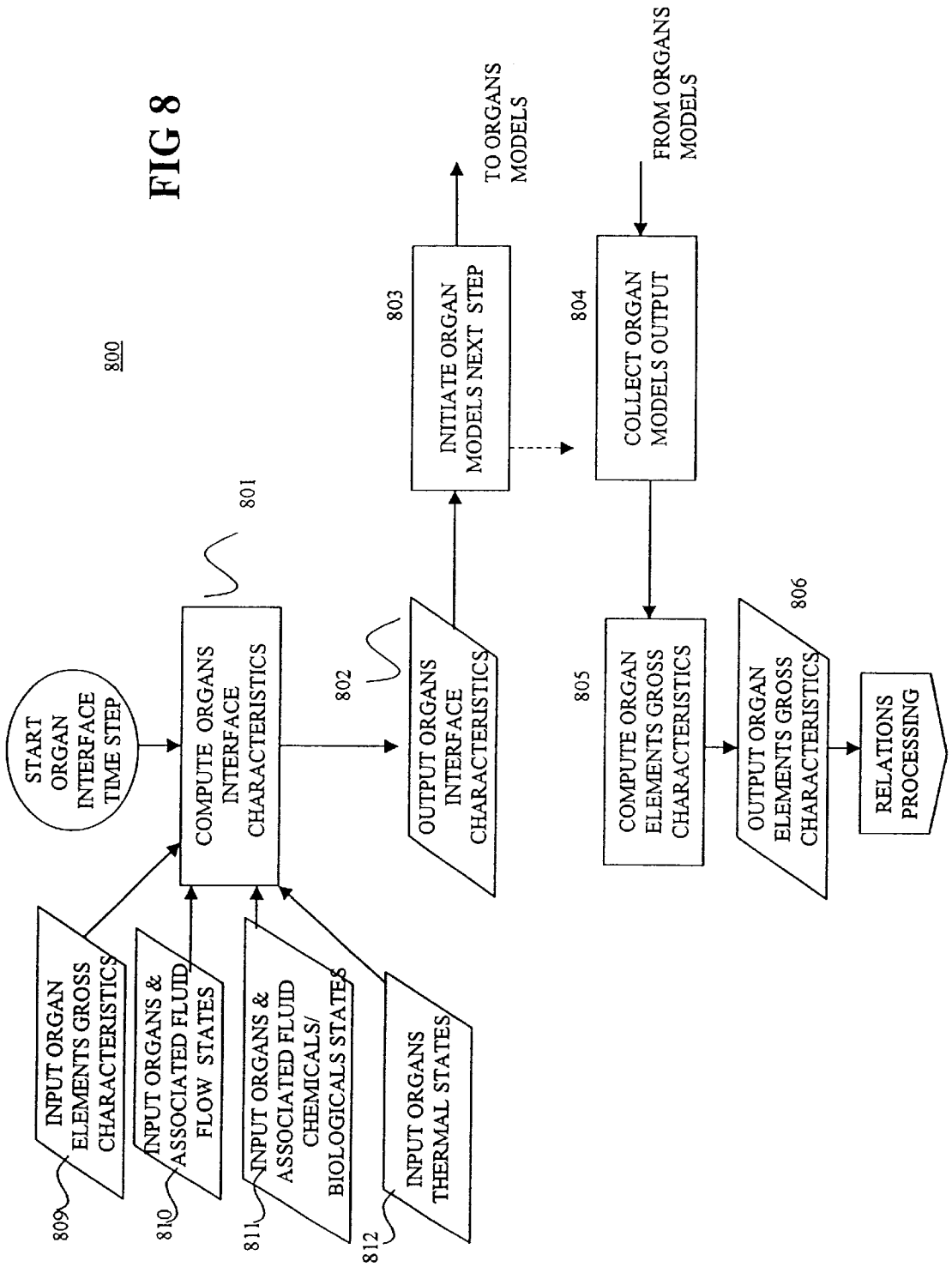
FIG. 8 shows a flow chart of the organs' interface.
Figure 9:
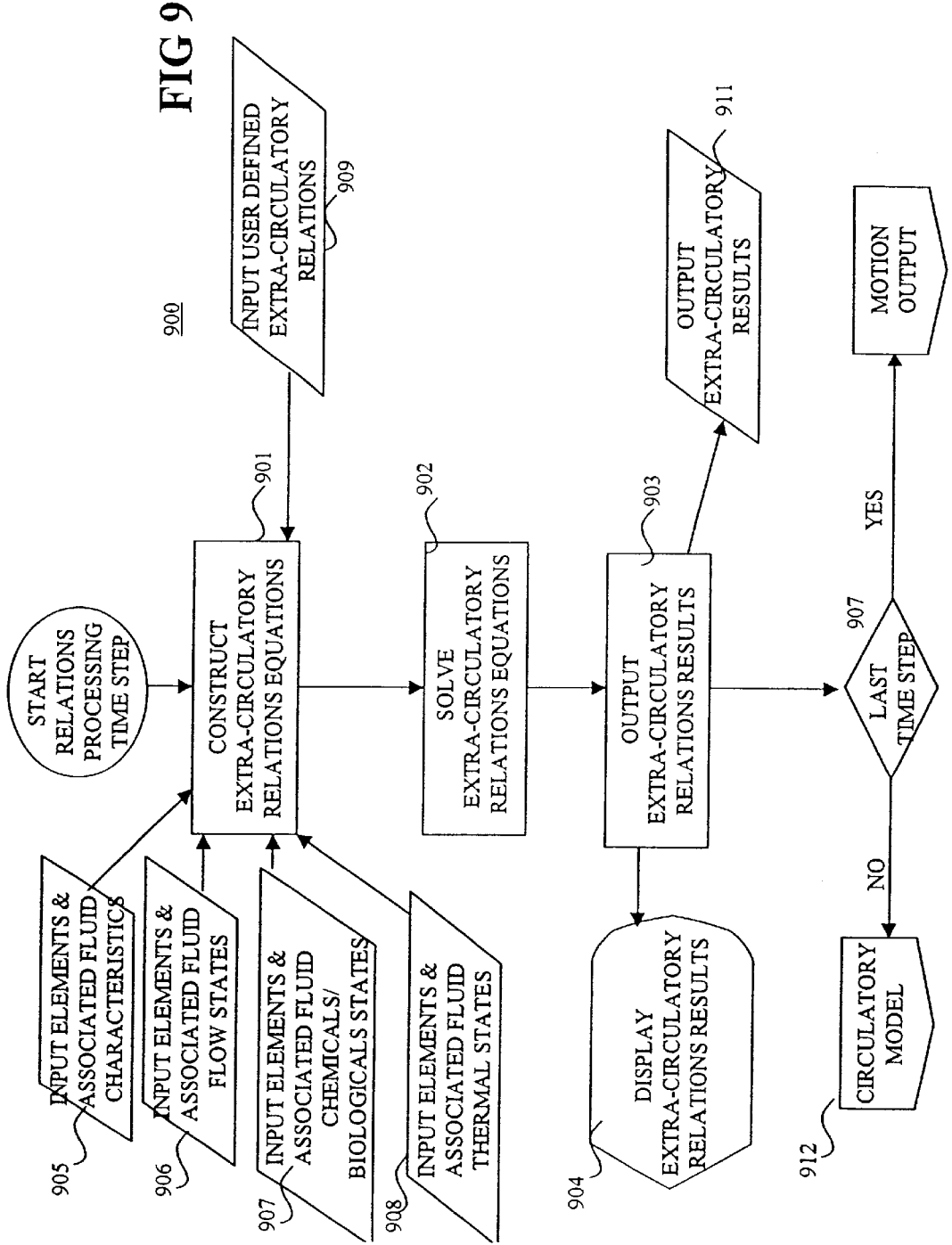
FIG. 9 shows a flow chart of the user defined extra-transport model and the relations processing engine.

Since the CB-TSS in this embodiment is oriented around the fluid flow, a description of the Fluid Flow Model 400 as shown in FIG. 4 provides a logical starting point. The CB-TSS results for the time step n+1 are computed on the basis of the state of the simulator at the $n^{th}$ time step and the mathematical relations determined by the CB-TSS configuration at that point in time. The first time step results are computed on the basis of initial conditions input by the user. The initial conditions are input as part of data by the user in Blocks 301, 303, 305, 307, 309, 311 and 313 and are stored in memory as data for the various models in 302, 304, 306, 308, 310, 312 and 314. If the user chooses to substitute a detailed organ object for an organ element, the detailed organ model and data relating to that organ model would be entered by the user into the organ simulator for that organ. As well, the interface data regarding that organ object is entered by the user in Block 311. Again, one skilled in the art will realize that the order of data entry in 300 is not material.

These data are combined in Block 401 and arranged in Block 402 in a manner suitable for the Fluid Flow Model equation solver in Block 403 to determine the results for time step n=1. For subsequent time steps [i.e. n=2,3,4 . . . ], the prior time step state values are resident in memory 102, or can be retrieved from storage 124, and are made accessible through blocks 405, 406, 407, 408 and 409. This permits one to compute data values that are dependent on conditions of state. For example, a new value for fluid viscosity in 401 at each element based on the temperature of the fluid at that element in the prior time step can be made available in Block 408. As used herein, the term "flow states" refers, for example, to the pressure and flow rates of the associated fluid at a particular time step and also the effects this has on the element itself, e.g. drag force at the wall.

These elements and associated fluid characteristic values, element conditions of state, and associated fluid flow states are used to construct mathematical relations 402, based on known laws and empirical relationships, expressing the relations among variables at each of the elements. Different models of fluid motion can be constructed, depending on assumptions made about the fluid and element behavior as determined by user input.

A highly preferred embodiment accommodates three types of dependency relating to time: (1) steady state, in which the variables are functions of spatial location alone; (2) quasi-steady-state, in which the fluid flow is independent or relatively independent of time [e.g. fluid acceleration terms negligible] but concentrations of chemicals and biologicals, for example, can change with time at each spatial location; and (3) transient, in which fluid flow and pressures vary to accommodate for example pulsation of the heart. This embodiment also allows quasi-spatial independence where major sections of the Bio-Transport System are lumped into single elements, removing almost all spatial detail and reducing the problem to the solution of sets of ordinary differential equations in time. For illustrative purposes, this embodiment covers one spatial dimension [along the channel length], although other time and spacial dependencies [e.g. two or three spatial dimensions] may be accommodated.

To help clarify the process step of assigning algorithms representing equations of flow to an element, a simple example is used wherein at the $j^{th}$ element of the $j_{max}$ elements [flow channel elements and organs elements], for the $n^{th}$ time step:

$p_{n,j,1}$ is the pressure at the inlet of the $j^{th}$ element
$p_{n,j,2}$ is the pressure at the outlet of the $j^{th}$ element
$v_{n,j,1}$ is the unit flow rate at the inlet of the $j^{th}$ element
$v_{n,j,2}$ is the unit flow rate at the outlet of the $j^{th}$ element
$A_{n,j,1}$ is the Area at the inlet of the $j^{th}$ element
$A_{n,j,2}$ is the Area at the outlet of the $j^{th}$ element
$l_j$ is the length of the $j^{th}$ element As explained above, this subscript notation is used for writing compactness to help in the teaching. In the BASIC language algorithms, variables would be appear, for example, as P(N,J,1) and a long expression might run to several lines of text. Another convention adopted is to use the <= sign to mean "replaced by" in equations, a common operation within computers, but conventionally denoted by = in many computer languages, which latter convention will be maintained for computer algorithms. Actual equalities will be denoted by a single = equal sign. Definitions, as listed above will be written with "is the" instead of an = sign or double colon. In this disclosure, certain data are presented as fixed, or dependent on position only or time only. Element length above is an example of a characteristic presented as a function of position only. This embodiment does, in fact, treat many of these "constants," such as the fluid viscosity, as functions of state by recomputing their values at each time step, although storage may not be provided to track such values over time. These conventions, used here and elsewhere to aid the teaching, should not limit the scope of the invention.

For purposes of this illustration, it is assumed that:
The fluid motion is steady state and incompressible;
There is no transverse flow of the fluid, or other materials, across the element walls;
The vessel walls are rigid;
The element network considered in this example, representing one of the simplest types of Bio-Transport system geometry, is non-branching;
The network is closed with a single prime mover that supplies a constant head; and
No external gravitational or motion effects are present.

These assumptions lead to a certain set of equations [see below]. It should be noted, however, that other equations relating the variables for other types of flow behavior, are well known [see, for example, Streeter & Wylie 1967; Fung, Y. C., "Biodynamics: Circulation", Springer Verlag, New York 1984; McDonald, D A, "Blood Flow in Arteries", Edward Arnold, London, 1974; Milnor, W. R., "Heamodynamics", Williams & Wilkins, Baltimore, 1982] and can be applied in an analogous manner. This embodiment allows a user to chose, from different sets of such equations, a set/model suitable to match operating conditions of the Bio-Transport System under study as mentioned above. The CB-TSS may be expanded to allow a user to chose from an even broader menu of equation sets.

Under the conditions assumed above, the state of the n+1 incremental time step of the Fluid Flow Model is equal to the state of the $n^{th}$ time step, for all n, and the mass flow is the same in all elements of a steady state, non-branching network. For an incompressible fluid, mass flow and volume flow are equivalent, so conservation of fluid mass without any transverse flow across the element wall yields:

$$v_{n,j,1} A_{n,j,1} = v_{n,j,2} A_{n,j,2} \text{ for all n, for each j.} \quad [1.1]$$

And by identity, the input unit flow rate of an element is equal to the output unit flow rate of the predecessor element:

$$v_{n,j+1,1} = v_{n,j,2} \text{ for all n, for each j.} \quad [1.2]$$

With each area specified as geometry by the user, every $v_{n,j}$ can be expressed in terms of a single one. Combining [1.1] and [1.2], the entrance flow rate for the j+1 element can be computed from the entrance flow rate of the $j^{th}$ element for each j:

$$v_{n,j+1,1} <= v_{n,j,1} A_{n,j,1}/A_{n,j,2} \text{ for all n, for each j.} \quad [1.3]$$

Furthermore, since continuity of the vessel wall across elements is required:

$$A_{n,j+1,1} = A_{n,j,2}. \quad [1.4]$$

Thus, $$v_{n,j+1,1} <= v_{n,j,1} A_{n,j,1}/A_{n,j+1,1} \text{ for all n, for each j.} \quad [1.5]$$

This expression can be compared with [Watters 1984 p5 (2.1)] for a constant fluid density.

Expressing this relationship [1.5] in BASIC, provides an algorithm for computing all flow rates at a given time step, N, as:

$V(N,1)=V1(N)$

FOR J=1 TO NUMBER_OF_ELEMENTS $V(N,J+1)=V(N,J)*A(N,J, 1)/A(N,J+1, 1)$

NEXT J $\quad [1.51]$

So the entrance flow of an element can be computed from the entrance flow of its predecessor element beginning with the first element flow rate, which is labeled $V_1$ [or in BASIC nomenclature V1(N)]. Using [1.5], the entrance flow of the second element from the entrance flow of the first element can be computed. Applying [1.5] again, the entrance flow of the third element can be computed. In this recursive fashion, as illustrated in [1.51], all flow rates can be expressed in terms of one unknown, $V_1$.

An empirical equation relates the wall drag in an element to the flow rate, which in turn must balance the pressure drop when there is no fluid acceleration. For a Newtonian fluid this is of the form as it appears in the steady state, balance of forces equation:

$$p_{n,j,1} A_{n,j,1} - p_{n,j,2} A_{n,j,2} = C_{dn,j} v_{n,j}^2 \, l_j \, PER_{w n,j} \text{ for all n, for each } [1.6]$$

where:

Cdn,j is the unit surface area coefficient of channel wall drag within the $j^{th}$ element in the $n^{th}$ time period which is a function of the fluid's Reynold's number and the surface roughness of element wall;

$v_{n,j}$ is the average flow rate within the element; and $PER_{w n,j}$ is the wetted perimeter of the $j^{th}$ element in that time period.

This formulation can be compared with the Darcy-Weisbach formula [ibid. p7, equation (2.4)].

It is then possible to compute the pressure at the exit of an element from the entry pressure as follows:

$$p_{n,j,2} = [p_{n,j,1} A_{n,j,1} - C_{dn,j} v_{n,j}^2 \, l_j \, PER_w]/A_{n,j,2} \text{ for all n, for each } [1.7]$$

Since the pressure at the entrance of an element is equal to the pressure at the exit of the preceding element and the elements are continuous:

$$p_{n,j+1,1} = [p_{n,j,1} A_{n,j,1} - C_{dn,j} v_{n,j}^2 \, l_j \, PER_w]/A_{n,j+1,1} \text{ for all n, for each j.} \quad [1.8]$$

The average flow rate within the element, $v_{n,j}$ is approximated as:

$$v_{n,j} = [v_{n,j,1} + v_{n,j,2}]/2. \quad [1.9]$$

Thus, $$p_{n,j+1,1} <= [p_{n,j,1} A_{n,j,1} - C_{dn,j}[[v_{n,j,1} + v_{n,j,2}]/2]^2 l_j \, PER_w]/A_{n,j+1,1}. \quad [1.91]$$

Therefore, the algorithm [1.91] relates the pressure at the entrance of an element to the following:

The pressure at the entrance of the predecessor element,

Flow rates, all of which can be expressed in terms of $V_1$, and

Known properties of the fluid and elements [$C_{d,n,j}$, cross-sectional areas, et. al.]

The difference between dynamic pressure and static pressure should be discussed. In an element where the exit area is smaller/larger than the entrance area, the fluid actually accelerates/decelerates. Hence, part of the pressure difference between entrance and exit is taken up with this acceleration of fluid. Also side-wall pressure should be addressed and the possible turning of the element [elbows] in the direction of flow. These aspects are explained in the literature [Kenyon 1960, pp 104–108] and, for a straight element, equate to a pressure correction of:

$$p = \rho v_{n,j,1}^2 [1 - [A_{n,j+1,1}/A_{n,j,1}]^2]/2 \quad [1.10]$$

where $\rho$ is the mass density of the fluid.

This additional term illustrates the possible confusion that can arise in teaching when the starting point is a mathematically precise statement of the total problem.*note-2 For simplicity, an "intuitive" derivation is outlined here and a dynamic term is included as a "correction."

The combination of these two terms can be converted to an equivalent BASIC notation, viz:

TOTAL_P=0.0

FOR J=1 TO NUMBER_OF_ELEMENTS

VBAR=(V(N,J)+V(N,J+1))/2

P(N, J+1)=(P(N,J)*A(N,J)−CD(N,J)[[VBAR**2*L(J)*PERW(J))/A(N,J+1)

P(N,J+1)=P(N,J+1)−RHO*V(N,J)**2*(1−(A(N,J+1)/A(N,J))**2)/2

TOTAL_P=TOTAL_P+P(N,J+1)

NEXT J   [1.92]

In a closed loop, the sum of the individual pressure drops through each element must add up to, for example, the head provided by a constant prime mover pump. Thus, $$dp_{n,j} = \text{Head}_{prime\text{-}mover,n} \; j=1,j \text{ max for all n.} \quad [1.10]$$

Combining [1.5] and [1.6] and expressing all flow rates in terms of $V_1$ provides:

$$F(V_1) = \text{Head}_{prime\text{-}mover,n} \quad [1.11]$$

Given that the head of the prime mover is known, and here is only one unknown, $V_1$, this is, under normal circumstances, solvable in the mathematical sense of existence. To obtain a solution using a computer requires a known value on the right side of the = sign, and the value sought to be computed on the left side. One approach would be to explicitly invert F( ) so as to compute:

$$V_1 = F^{-1}(\text{Head}_{prime\text{-}mover,n})$$

This task, upon looking at the algebraic equations involved, appears formidable, but quite desirable from a computational viewpoint.

Another approach is to assume a value for $V_1$ and use algorithm [1.51] to compute all subsequent V(N,J). Then the algorithm [1.92] can be used to compute the pressure drop in each element, the total of which must add up to the constant head pump capacity of [1.10]. For example, assume an initial guess for the volumetric flow, $Q_1 = V_1 A_1$, of 50 ml/sec and a computed total pressure drop of 0.1 atm, compared with an actual pump pressure head of 0.11 atm. One might try the next volumetric guess at a value of 55 ml/sec, likely leading to a computed value somewhat in excess of the actual pump pressure. One would then reduce the second guess in some rational way and proceed in this fashion until the difference between the computed pressure drop matched the actual pressure drop to the degree of accuracy desired. Techniques to converge on an answer by a series of successive rational adjustments are well known to one skilled in the art.

In many practical situations, the prime mover does not deliver a specified head, but one implicitly related to the flow rate. Accordingly the following must be solved:

$$F(V_1) = \text{Head}(V_1).$$

This is still one equation and one unknown and, in most instances can also be solved in the mathematical sense of existence, and in the algorithmic sense of convergence to a physically correct answer. In this embodiment, both implicit and explicit boundary conditions are handled. It should be noted here that the heart actually consists of two, coupled pumps so what has been outlined above needs to be modified somewhat before it is directly applied to the human circulatory system.

Some quite practical circulatory configurations can be approximated using a non-branching circuit by replacing parallel element paths with one equivalent element. However, most problems require the solution of a branching network of elements. There exist known methods in the art to accommodate branching and joining of elements in a network of flow channels, for example, Fox, J. A. "Hydraulic Analysis of Unsteady Flow in Pipe Networks", John Wiley & Son New York 1977 and Lighthill 1975, much as currents and voltages are determined in a network of serial and parallel resistors. Other restrictions imposed by the initial assumptions, such as transverse flow through the vessel walls are Bergel, D. H. "Cardiovascular Fluid Dynamics" Academic Press London & New York 1972, an open rather than a closed network, and external gravitational forces [see Dynamic Model in this disclosure] can be relaxed using methods well known in the art.

In addition to providing a relatively simple illustration of the process of assigning equations/algorithms to each of the elements, the steady state solution for circulatory flow is quite useful in predicting many practical results. Using perturbation theory, transient chemical/biological and heat transport, as well as certain effects of external dynamical and physiological influences can be reasonably approximated using the steady-state flow model. The modest computational demands of the steady-state solution permit simulations with much finer mesh size to be computed in the same time as a transient flow solution, yielding more accurate results for the same investment in computational resources.

It is also possible to represent slow transient changes, where the flow and pressure values of $n+1^{th}$ time step differs only slightly from the $n^{th}$, in what is referred to herein as a quasi-steady state manner. This extends further the usefulness of the steady state circulatory model to include changes brought about, for example, by a gradual modulation of flow and/or pressure. cannot account for pressure and flow pulses created by a prime mover such as the heart in animal circulatory systems. For this class of problems [transient flow], a true time dimension is added to the Bio-Transport flow model.

In simple fashion, this adds a term to account for the acceleration of the mass of fluid within the element. The effect is to give rise to traveling pressure waves, for example, Shadwick, Robert E. "Elasticity in Arteries", American Scientist, November-December 1998, pp 535–541, and Lighthill 1975. The governing equations for transient flow of compressible fluids in elastic vessels are well known in the art see, for example, Streeter & Wylie 1967. Streeter & Wylie also detail a solution using the Method of Characteristics [ibid]. These mathematical formulations can be reduced to computer algorithms in a manner analogous to that outlined above for steady state flow by procedures well know in the art.

While the Method of Characteristics is useful for certain classes of problems, it can have some difficulty providing accurate solutions to an important class of physiological configurations that involve "Windkessel" effects [Shadwick op.cit.] where the pressure pulse is rapidly modulated by a large/flexible vessel section close to the prime mover pump.

An alternative to the Method of Characteristics is outlined below by way of suggesting a more suitable approach for certain types of bio-transport dynamic transient problems and to indicate that alternative approaches are possible to obtain a computer-based solution. For this example, a simplified case of transient flow is outlined. For purposes of illustration, assume that:

The fluid is incompressible,

The vessels all have the same cross-sectional area,

The fluid is frictionless,

There is no transverse flow of the fluid or other materials across the element walls, The stress/strain characteristic relationships of the vessels are piecewise linearly elastic.

The element network considered in this example, representing one of the simplest types of circulatory system geometry, is non-branching, The network is closed with a single prime mover that supplies a time varying head, The initial state of the fluid and elements throughout the network are known to be, for example, some steady state condition, No external gravitational or motion effects are present.

At the inlet of the first element after the pump [j=1], the pressure for the n+1 time step is determined by a user-specified pump pressure profile over time, $P_{prime-mover, n+1}$, providing the following condition at the outlet of the pump prime mover:

$$p_{n+1,1,1} = P_{prime-mover, n+1} \qquad [2.1]$$

From conservation of momentum, the change in average flow in the first element for the n+1 time period is given as d(mv)=fdt, providing:

$$v_{n+1,j} = v_{n,j} + [A[p_{n+1,j,1} + p_{n,j,1}]/2 - A[p_{n+1,j+1,1} + p_{n,j+1,1}]]\Delta t / \rho[VOL_{n+,j} + VOL_{n,j}]/2 \qquad [2.2]$$

From conservation of mass for an incompressible fluid:

$$vbar_{n+1,j,2}A = vbar_{n+1,j,1}A - [VOL_{n+1,j} - VOL_{n,j}]/\Delta t \qquad [2.3]$$

where:

$vbar_{n+1,j,2}$ is outlet average flow rate during the time period;

$\Delta t$ is the time lapse between the n and n+1 time step;

$\rho$ is the mass density of the fluid; and $VOL_{n,j}$ is the volume of fluid in $j^{th}$ element at the $n^{th}$ time step.

The change in volume is a result of a pressure change and can be estimated from basic material properties of a vessel wall. To this end, a linear relationship is used:

$$VOL_{n+1,j} - VOL_{n,j} = VOL_{n+1,j} K p_{n+1,j} \qquad [2.4]$$

where K is the experimentally determined proportionality constant. This covers approximately the relationship in many ordinary vessels with simple geometries. This also covers, as a first order approximation, certain vessels of complex structure and/or geometry whose pressure-volume relationship cannot be reduced, even with great effort, to basic material properties. Shadwick [ibid] provides an extended discussion and references of the elastic behavior of blood vessels, including axial constraint due to the Possion effect.

One skilled in the art realizes that the pressure-expansion relationship for a tubular vessel contains the potential for progressive failure. Thus an approximation such as [2.4] might be inappropriate in the study of aneurisms, for example. In the CB-TSS, there are a few options available for the user to specify the elastic characteristics of the vessels; hence the term "configurable". Many more options may be added in the future to improve the realism and accuracy of the projections over a broad range of applications.

The elasticity of the vessel walls is addressed at this point since it is an important consideration in pulsating flow in the human circulatory system. Wall extension affects the attenuation of the pressure wave, in comparison with a rigid wall model, as the wave moves away from the heart thereby reducing the potential for wall fatigue failure.

Combining [2.3] and [2.4] and simplifying provides:

$$vbar_{n+1,j,2} = vbar_{n+1,j,1} - [Kp_{n+1,j}]/A\Delta t \quad [2.5]$$

Average flow is approximated as follows:

$$vbar_{n+1,j,2} = [v_{n,j,2} + v_{n+1,j,2}]/2, \quad [2.6]$$

and average flow within the element is approximated as follows:

$$v_{n,j} = [v_{n,j,1} + v_{n,j,2}]/2 \quad [2.7]$$

These relations suggest a computational strategy to determine the three components v1, v2 and p2. Conservation of momentum provides:

v=[v1+v2]/2=impulse from p1 without p2 pushback (a somewhat high estimate).

Conservation of mass provides:

v1−v2=change in vol due to p1/2 (a somewhat lower difference).

Conservation of energy provides an estimate of p2 based on an integral of conservation of momentum (p1,v1,v2) less strain energy absorbed by the vessel wall. That is, the actual momentum integral must be reduced by p2 so enough is left for strain energy (se), basically p2dt=se. Since the first estimate of se will be high, the second estimate of p2 will be high. If it converges, it probably would converge by oscillation.

Two new physical effects arise as a result of considering transient flow conditions. In equation [2.2] an impulse is imparted to the slug of fluid within the element as a result of the imbalance of forces. In equation [2.3], some of this impulse "shock wave" is "absorbed" by the flexibility of the vessel walls [Shadwick ibid], and some passed on to create a p2, thus providing:.

$$p_{n+1,2,1} <= p_{n+1,1,2} \quad [2.5]$$

By repeating the above process for all elements, equations can be constructed in Block 402 at each of the elements and then solved in Block 403 to determine the pressure and flow rate vectors in Block 403 for the n+1 [current] time step from the past conditions of state in this transient condition.

The resultant solution for flow rates and pressures at each element for this current time step is assembled for output in Block 404, stored by Block 410 for later use, and is subsequently used via Block 406 to determine characteristic values, for example wall diameter from a known relation to fluid pressure, for the next time step. The flow rates and pressures are stored by Block 410 and are subsequently used in the Mass Transport Chemical/Biological Model via Block 506 and the Heat Transport Model via Block 606, in the Dynamics Model via 706, in the Organs Interface via 810, and in the Extra-Bio-Transport Model via Block 906, to determine respectively mass and thermal energy transport for the current time step. Displays of the Fluid Flow Model-results are made available to the user via Block 413.

It is not the intent of this disclosure to teach how to set up and/or solve finite difference or finite element problems either for steady state, transient or other flow conditions. The process of setting up accurate and efficient computational procedures for fluid flow in channels is well known [Lighthill 1975]. The preceding simplified equations for steady state and transient flow are included only to clarify the process step for setting up computational procedures at each of the elements rather than to specify computationally correct or efficient procedures. One skilled in the art will recognize the following:

1. There are other computational techniques to determine pressures and flow rates for the next time step which minimize some of the cumulative errors possibly introduced by the simplified techniques used for illustrative purposes in the steady state and transient procedures outlined above. Empirical relations more complex than given in [2.4] which can be dealt with using known techniques to approximate different relationships in different regions of the Bio-Transport system.

2. Blood is a common medium in circulatory systems. It consists mainly of a fluid-like plasma, and discrete cells. This combination does not behave as a Newtonian fluid [Bergel 1972], for example, when the cells are of the order of the vessel diameter, nor, when it can be so approximated, does a Newtonian fluid operate in the laminar region below the transition Reynolds Number as it does above the transition Reynolds Number with a dependance on the square of the flow rate. These facts may require different relationships than that given in [2.4], and some of these are accommodated in the present embodiment.

3. The conditions that exist at the outlet of a heart may require a different type of forcing function, e.g. more like that of a piston, than a prescribed pressure schedule as used in the computational example above. For example, actual outlet conditions may be better approximated by a prescribed flow schedule. Using, $Q_{prime-mover,n+1}$ as the starting point volumetric flow rate for the next time step and the prime mover outlet, one skilled in the art can see that a similar process to that described above for a prescribed pressure driver could be used to determine, in an analogous succession of operations through the elements, the pressures and flow rates at each of the elements for the n+1 time step. For the pump element, the ability to specify combinations of both flow driven and pressure driven conditions as well as implicit relationships may need to model a wide range of actual bio-transport situations.

4. Other embodiments of the simulator may provide more extensive menus of conditions of flow and constitutive relationships, covering, for example, flow of elastic-plastic and viscoelastic materials in the digestive tract and elements capable of emulating peristaltic effects, and the algorithms used to arrive at solutions will be both more accurate and more efficient.

Therefore, the scope of this invention should not be limited by the illustrated process of setting up the algorithms as outlined above.

b. Mass Transport Chemical/Biological Model

To help illustrate the Mass Transport Chemical/Biological Model [MTC/BM] 500 it is assumed that:

Changes in chemical concentration are primarily caused by flow of the transporting medium, rather than by diffusion of a chemical brought about by a concentration gradient within the fluid;

Both flow through vessel walls and chemical/biological reactions among the various chemical/biological components in the circulatory system are negligible Conservation of mass for a single chemical provides a simple way to compute the new concentration at an element:

$$c_{n+1,j} <= [c_{n,j} VOL_{n,j} + [c_{n,j,1} A_{n+1,j,1} v_{n+1,j,1} - c_{n,j,2} A_{n+1,j,2} v_{n+1,j,2}]t]/VOL_{n+1,j} \quad [3.1]$$

where:

$c_{n+1,j}$ is the concentration within the $j^{th}$ element, at the n+1 time step;

$c_{n,j,1}$ is the concentration at the inlet of the $j^{th}$ element at the $n^{th}$ time step;

$c_{n,j,2}$ is the concentration at the inlet of the $j^{th}$ element at the $n^{th}$ time step;

$A_{n+1,j,1}$ is the inlet area at the $j^{th}$ element at the $n+1^{th}$ time step;

$v_{n+1,j,1}$ is the unit flow rate at the $j^{th}$ element inlet at the $n+1^{th}$ time step;

$A_{n+1,j,2}$ is the outlet area at the $j^{th}$ element at the $n+1^{th}$ time step;

$v_{n+1,j,2}$ is the unit flow rate at the $j^{th}$ element outlet at the $n+1^{th}$ time step; and $VOL_{n+1,j}$ is the volume within the $j^{th}$ element at the $n+1^{th}$ time step.

The values of A and VOL input in 505 for the current time step [n+1] are computed using the Fluid Flow Model solution that, in this embodiment, precedes the chemical/biological calculations within the current time step, and is therefore available through Block 506 for use computing characteristic values in Block 501. These known and computed quantities are used in Block 502 to construct the algorithms. The fluid unit flow values [$v_{n+1,j,1}$ and $v_{n+1,j,2}$] for the Fluid Flow Model are also for the current time step [n+1] of the Fluid Flow Model and separately shown as input in Block 506.

This sequencing of the solution steps so that the unit flow values precede the other Bio-Transport system model values [MTC/BM, Heat Transport Model, et. al.] is for illustrative purposes and should not be used to limit the invention. Forward differences, which permit the next state values to be computed explicitly from previous values, as mentioned elsewhere, can cause cumulative errors to build but are computational fast since iteration and/or matrix inversion is avoided. Again, it is not the intent of this disclosure to teach how to construct accurate, efficient algorithms to solve finite difference/finite element equation. These techniques are well known to one skilled in the art. Nowadays, use of more accurate algorithms is possible for many practical problems. It is anticipated that increased availability of parallel processing computers and/or fast networks connecting server computers will provide the computational power necessary for the next time step in all of the models to take place in a manner that is an improvement over simple algorithms, as outlined herein, to solve simultaneous equations.

Noting for example that $c_{n,j,1}$ can be approximated by the following computation:

$$c_{n,j,1} <= [c_{n,j-1} + c_{n,j}]/2. \quad [3.2]$$

It is now possible to compute the concentration of a chemical/biological constituent within each of the elements for time step n+1 from known quantities at the previous chemical/biological model time step and the current time step for the Fluid Flow Model results using an algorithm that applies [3.2] and then uses that result in [3.1]. Obtaining the solution occurs in Block 503.

A few observations are in order:

1. The mass balance for this chemical, as given in algorithm [3.1], is based on flow conditions at the end of the current time step. One skilled in the art will realize that writing the mass balance on the basis of average flow during the time step provides improved accuracy at the expense of computational efficiency although the resultant complexity would obscure the teaching herein.
2. The linear interpolative relation [3.2] assumes that the average concentration in the mass balance [3.1] is identical to the concentration at the geometric center of the element. This would require, at minimum, through mixing, such as might occur in turbulent flow. Empirical relations describing, for example, mixing under laminar flow conditions may be included in future embodiments of the Bio-Transport system simulator.
3. Even if the Fluid flow is steady state, the concentration of a chemical [or biological] entity, initially only a function of spatial location, can vary over time. This speaks to the utility of a steady state or quasi steady state fluid flow option for the rapid but reasonably accurate solutions of this class of conditions where, for example, concentrations are low.
4. Biologicals and other materials may consist of undissolved particles whose densities differ from the fluid. These particulates can travel at flow rates that differ from that of the surrounding fluid. There are known techniques to incorporate such effects and these effects may be included in other embodiments of this invention.

Having initially ignored chemical/biological flow across the wall of the elements, it will now be instructive to outline the components of this term in the mass chemical balance stated above in algorithm [3.1], realizing that analogous algorithms can be constructed for biologicals. At an element with a semi-permeable wall, the chemical flow across the element wall in a time step $t_n$ can be approximated, for example, as a linear function of the concentration gradient:

$$Q_{o,n,j} <= H_w [c_{n,j} - C_{n,j}] t_n l_j PER_w \quad [3.3]$$

where:

$Q_{o,n,j}$ is the outflow rate of the chemical from the volume within the element during the time step;

$H_w$ is the coefficient of chemical gradient flow across the semi-permeable wall membrane;

$C_{n,j}$ is the concentration of the chemical on the outside of the element wall; and $PER_w$ is the wetted perimeter of the element.

Including this term in computer equation [3.1] means that the effect of mass transport across the element wall boundary can be incorporated to extend the usefulness of the simulator. One skilled in the art will realize that transport relationships other than the one chosen for this teaching can be simulated and in particular, that osmotic processes, wherein the flow of the solvent is involved can also be modeled. In addition, empirical relations can be constructed for biological entities. Some simple linear relationships are included in this embodiment. Other embodiments may comprise a more extended menu of transport relationships both for biological and chemical entities.

This embodiment associates a volume characteristic with an element. The concentration, $C_{n,j}$, of this volume is adjusted in accordance with mass conservation by the amount of chemical flowing out of or into the fluid contained within the element. This provides an ability to account for local equilibrium conditions, wherein the material surrounding the outside of a vessel/capillary [e.g. the interstitial space] reaches a chemical concentration equal to the concentration in the fluid contained within the element. Sodium chloride levels within blood vessels versus levels within the surrounding tissue provide an example of how such functionality could be usefully employed. Once the tissue associated with an element achieves equilibrium, salt in the blood is no longer removed [or added in reverse flow] at that element location. It may be preferable to account for the ability to consume a chemical at a given rate in the exterior neighborhood of an element. For example, studies then can be conducted on depletion phenomena such as oxygen consumption in the human body.

Chemicals and biologicals react with one another within the Bio-Transport system fluid, on vessel walls and within and in the neighborhood of organs. These reactions affect the algorithms constructed from balance of mass considerations. Therefore, the algorithm for conservation of mass [3.1] for any of the chemical and biological entities also needs to be adjusted for generation of additional mass from the combination of reactants when that entity is the product of the reaction, and removal of mass when that entity is one of the reactants. This does not violate conservation of mass but simply extends it to include, for example, reactions and radioactive decay.

In this embodiment provision is made for the specification by the user of reactions of the type:

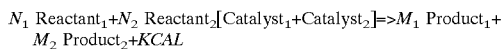

Where:
  $N_1$ is the number of units [e.g. moles] of the chemical/biological Reactant$_1$:
  Reactant$_1$ is the first entity to be combined to product the end products;
  Catalyst$_1$ is the chemical/biological catalyst facilitating the reaction;
  $M_1$ is the number of units [e.g. moles] of the chemical/biological Product$_1$ produced; and
  KCAL is the amount of energy given off/absorbed by the unit reaction [e.g./mole].
And reaction rate forms such as Michaelis-Menten:

$$r=R_{max}*[c]/([c]+K_m)$$

where:
  $R_{max}$ is the maximum reaction rate [e.g. moles/sec];
  r in the reaction rate;
  c is the reactant concentration; and
  $K_m$ is the Michaelis constant.

Data regarding the reactions for each of the chemical and biological entities, their reaction rates are supplied 509 from input originally provided by the user. Reaction rates can depend on, among other factors, the nature of the reaction, the thermodynamic state in the time-space neighborhood, and the presence of catalysts such as enzymes. Biological entities can have need for additional rules for example to account for cell division. In this embodiment, these reactions are solved by the chemicals/biologicals reactions engine 513 and the resultant mass adjustments used to modify the transport results in the current time step 514.

The MTC/BM processes these user input reaction equations at each element to adjust the mass balances for all chemicals and biologicals after results from the current time step of the transport effects have been made. One knowledgeable in the art will realize that these adjustments can be iterated to create the effect of a parallel solution. It is anticipated that other embodiments will include such iterative solutions.

In algorithm [3.1] the computation of the current chemical concentration level within the element associated fluid is made from results available from the previous time step [or in the case of the Fluid flow results, the current time step] through Blocks 505, 506 507, 508 and 509. For the first time step, these results are part of the initial conditions input by the user in Blocks 301, 303, 305, 307, 309, 311 and 313 and are stored in memory as model data in Blocks 302, 304, 306, 308, 310, 312 and 314.

In a similar manner, the results of the chemical/biological calculations for the current time step are output in Blocks 510 and 511 for use in the next time step by the Fluid flow model, or in the current time step by the Heat Transport model and the organ interface. Display of the chemical/biological results is made available to the user by Block 512.

In light of this disclosure, one skilled in the art will realize that:

1. There are known computational techniques to reduce or eliminate cumulative error effects. This results in increased accuracy for a given mesh size and time increment.

2. Entry or exit of a chemical/biological via transverse transport through a semi-permeable element wall, or from the reaction of chemicals/biologicals within the element volume, or via injection from an outside may be handled more precisely and with better accuracy than as outlined above using known techniques.

3.

4. The movement of particles through the Bio-Transport system is predictable under certain conditions relating to the size of the particles and the flow channel diameters.

5. The movement and reproduction of cells, viruses, bacteria and other biological entities is predictable under certain conditions relating to size and concentration of the biological entity and channel diameters.

6. The effect of diffusion of chemicals on concentrations is estimable using established techniques.

7. Formation of deposits on the vessel walls can be simulated approximately by changes in the inside diameter of the affected vessel segments generically determined by chemical/biological concentrations/reactions in the neighborhood of the segment. The mechanisms for such deposits may be elucidated more fully and the simulator modified to represent more realistically the actual behavior.

The outcome of the chemical/biological model computations may affect the conditions used to determine the flow rates in the Bio-Transport model. For example, a change in concentration of a chemical may affect the viscosity of the Bio-Transport fluid, or the channel wall buildup of material deposits might change the effective inside wall diameter as well as the drag coefficient for various elements. The relevant MTC/BM results are fed back through 220 to the Fluid flow model. It is easy to see that in the case of wall build-up, the diameter used to compute the n+1 flow rates will consistently be larger than the actual element diameter, again resulting in cumulative errors for the method and order chosen for teaching. Here it is more obvious than in the Bio-Transport model's difference algorithms that errors can accumulate using simple forward differences. As mentioned elsewhere, there are known techniques to reduce or eliminate the effect of a biased estimate in the difference algorithms.

c. Heat Transport Model

A simple exposition of the Heat Transport Model [HTM] 600 also is built around the assumptions that:

The primary effect of changes in thermal energy concentration, as measured by temperature, results from mass transport of this energy by the transporting medium rather than by thermal diffusion on a temperature gradient within the fluid.

Heat flow across the wall and heat generation from chemical/biological reactions are neglected for the moment Under this set of assumptions and using conservation of thermal energy, algorithms analogous to [3.1] and [3.2] above can be used to compute the n+1 time step temperature vector from known quantities at time step n. These known quantities such as the characteristic values of the elements and fluid within the elements Block 605, unit flow values from the current time step of the Fluid Flow Model Block 606, chemical/biological state effects Block 607, and the prior thermal state Block 608 are input to the Heat Transport Model. In Block 601 these known values are used to compute thermal characteristics such as the specific heat of the fluid contained in an element. From these known and computed values, equations are constructed in Block 602, which includes the flow rates input from the Fluid Flow Model 606.

These thermal equations are adjusted to account for heat energy transport across the element wall in a manner similar to [3.3] for chemical/biological mass migration across a semi-permeable wall membrane, and for heat generated from chemical and biological reactions input in Block 610. The resultant equations are solved in Block 603 and the results assembled for output in Block 604. The temperatures are stored by Block 611 to be used in the next time step for the Fluid flow model, and a display of thermal results is available to the user in Block 612.

In light of this disclosure, one skilled in the art will realize that:

1. There are known computational techniques to reduce or eliminate cumulative error effects of forward differences as they relate to time steps. This results in increased accuracy for a given mesh size and time increment, typically at the expense of computational simplicity.
2. The effects of diffusion of thermal energy through the fluid on a temperature gradient within the fluid is estimable using established techniques.

The outcome of the HTM computations may affect the conditions used to determine the flow rates and the chemical concentrations. For example, temperature affects both viscosity and chemical/biological reaction rates, and so the solution obtained does not reflect simultaneity. While more computationally intensive, as mentioned elsewhere, there are techniques known to one skilled in the art, to reduce errors resulting from these effects. Such techniques may be included in the Bio-Transport system simulators.

d. Dynamic Model

The Dynamic Model 700 accounts for external gravitational attraction and rotational and translational accelerations to which the organism is subjected.

In the steady state Fluid flow model, conservation of momentum was reduced to a static balance of pressure drop against resistance to incompressible flow of a viscous fluid in a one-dimensional channel. In many practical cases, both these effects [fluid acceleration as a result of directional change and compressibility] could be included in the model by a person skilled in the art without need to consider a dimension other than that along the length of the channels.

To account for gravitational attraction or acceleration from external motions, however, each element is positioned in a 3D space. This then establishes an angular relationship between the external force/acceleration [dynamics] vector with the axis of flow, allowing the dynamics vector to be resolved into an axial component and one perpendicular to the axis of flow. The axial component either increases or decreases the pressure gradient, dependent on whether the axial component direction is opposite the direction of flow or in the same direction.

The positional location of the elements in space and the flow states within the elements are input in Block 705. Block 701 computes the geometric data needed for the dynamic equations to be constructed in Block 702. Once the appropriate geometric equations have been constructed, the external gravitational effects are combined with the geometries in Block 703 to yield axial and transverse components of the dynamic forces on the fluid within each element. These results are output by Block 704 to store Block 709 and then supply the Fluid Flow Model—with this impact on the pressure gradient in the next time step, for example. Output of the geometry and external forces on each element is prepared in Block 704 and made available as a display for the user through Block 710.

e. Interface to External Organ Models

Organs are typically represented in the simulator 100 as organ elements having gross characteristics such as an inlet area, an outlet area, an internal volume and an overall resistance to flow. Chemical and biological concentrations and reactions within the organ and heat Transport are handled on a bulk organ-averaging basis as well. This permits many useful real-life situations to be simulated with a reasonable degree of resolution and speed. However, there is no spatial mesh structure within an organ element. Certain important types of simulation studies would be ruled out if the Bio-Transport system simulator were limited to organ elements.

To add more realism to the Bio-Transport simulation and to permit a wider range of applicability for the CB-TSS, interfaces are provided that communicate, using known techniques, between the simulator 100 and external organ simulators operating either on the same CPU or on other CPUs that are part of the same multi-CPU computer, or as part of a network of computers. This arrangement not only improves the usefulness of all the connected simulators, but it forms the basis for an overall organism simulator of considerable scope and detail. Partitioning the problem into M inversions of matrices of dimension $S^3$ with loose coupling, is typically more computationally efficient compared with inversion a single matrix of dimension $[MS]^3$.

The boundary conditions imposed by the CB-TSS at the organs interfaces are provided to the organ interface in this embodiment through Blocks 809, 810, 811 and 812. Block 801 maps these values into a set of property values for each particular organ model. Block 802 uses standard techniques, well known in the art, to pass this information to the respective organ models [objects] residing either on the same computer using the same CPU, on the same computer using a parallel CPU, or on a server computer on a network. Block 803 initiates the independent processing tasks and initiates a local task 804 to collect the returning data from the various independent organ models. These data are passed to Block 805 which converts the data into organ element gross values such as average temperature and average chemicals/biologicals concentrations. These organ gross characteristics are stored by Block 806 for future use in the Bio-Transport system simulator. One skilled in the art will realize that accuracy can be improved by iterating within a time step among the organ objects simulators and the CB-TSS. This may create unacceptable delays for certain problem types using today's Internet response times for example. It is anticipated that techniques will be developed to both reduce the number of iterations within a time step and extend the time between inter-simulator communications to several time steps, instead of one to one, for many practical classes of problems. As mentioned earlier, describing the Organ Interface connection in a serial fashion should not be used to limit the scope of this invention.

It is anticipated that the ability to interface with an external organ model will be used by some to interface with important transitional vessel sections of a circulatory system. Thus, a user could create an external CB-TSS detailed model of the transition vessel section and declare that model as an "organ".

f. Extra-Bio-Transport Model and Relations Processing Engine

In this embodiment, the Extra-Bio-Transport Model 900, takes the n+1 step results from the prior models/interfaces [905, 906, 907, 908] and combines them with the user specified extra-Bio-Transport relations 909 to construct a set of extra-Bio-Transport relations equations 901. The resultant equations are solved by the Relations Processing Engine [RPE]902. The solution results are made available to the user via a display 904 and saved for use in the next time step and for after processing displays 911. In this embodiment the extra-Bio-Transport relations can affect elements and associated fluid characteristics, flow states, chemicals/biologicals states and thermal states. The term "chemicals/biologicals state" refers, for example, to the concentrations of chemicals/biologicals within the associated fluid and the concentrations of chemicals/biologicals on the wall of the element wall at a particular time step. Thus output 911 reflects all these modifications.

To provide a simple example, imagine a somewhat hypothetical situation wherein receptors in the hypothalamus at a position $(x_1,t)$ sense the local concentration of water in plasma, $Cw(x_1,t)$, and then regulate, $r_1$ time steps later, the production and thus the concentration of a hormone, $C_h(x_2, t+r_1 dt)$, at a different point in space, $x_2$. At some later time [i.e. $r_2$ time steps], this hormone increase, working its way through the circulatory system, would reach the kidneys where it would have a concentration $C_h(x_3,t+(r_1+r_2)dt)$ and accordingly cause elements in the kidney to permit absorption of water from the distal tubules so that the concentration of water in the plasma at the kidney $C_w(x_3,t+(r_1+r_2)dt)$ now begins to increase. In turn, the increase in water concentration at the kidneys would eventually work its way through the circulatory system and reach the receptors as $C_w(x_1,t+(r_1+r_2+r_3)dt)$. Here the increased concentration of water would begin to moderate the production of the hormone in a fashion typical to close the feedback loop.

To represent this in a standard simulator for the circulatory system, one can express at the receptor organ element a relationship:

$$Int(x_1,t)=f_1(Cw(x_1,t)), \qquad [4.1]$$

where:

Int is an intermediate standing for the link between the water concentration at the hypothalamus organ element and the production of the hormone; and $f_1$ is the functional relationship between the water concentration and the intermediate.

This is the type of special property an organ element can have, or that special elements can be endowed with. It relates the production of one entity to the concentration of another chemical entity at the same point in time/space.

And, at the kidney organ element:

$$C_w(x_3,t)=f_2(C_h(x_3,t)) \qquad 4.2$$

Again, this is the type of special property an organ element can have, or that special elements can be endowed with. It relates the production of one chemical entity to the concentration of another chemical entity at the same point in time/space.

The link between the Intermediate, Int, and the hormone output is:

$$C_h(x_2,t+r_1 dt)=f_3(Int(x_1,t)) \qquad [4.3]$$

Combining [4.1] and [4.3] provides:

$$C_h(x_2,t+r_1 dt)=f_3(f_1(Cw(x_1, t))) \qquad [4.4]$$

And [4.4] would be contained in the set of reactions at a distance relations to be processed by RPE. The relationships between the hormone concentration at the kidneys and its concentration at the hormone excretion site is automatically handled by transport in the circulatory system. Likewise, the relationship between the water concentration at the kidneys and its concentration at the receptors is also automatically handled by transport in the circulatory system.

Alternatively, we can express the relationship between the hormone concentration at the kidneys and its concentration at the hormone excretion site as:

$$C_h(x_3,t+(r_1+r_2)dt)=f_4(C_h(x_2,t+r_1 dt)) \qquad [4.5]$$

And the concentration of the water at the receptor site in terms of its concentration at the kidneys as:

$$C_w(x_1,t+(r_1+r_2+r_3)dt)=f_5(C_w(x_3,t+(r_1+r_2)dt)) \qquad [4.6]$$

Both [4.5] and [4.6] are reactions at a distance that can be processed by the RPE. Hence certain types of bio-transport phenomena can be modeled as reactions at a distance. Thus the EBTM, which is a useful component of the CB-TSS, is, in its own right, a CB-TSS that can simulate bio-transport systems by means of reactions at a distance.

These functional relationships at a distance $[f_3, f_4$ and $f_5]$ can be quite complex, and non-linear, involving functions of several other variables. So many bio-transport systems can be simulated using the EBTM. However, bear in mind that spacial definition is lost compared with the principal bio-transport simulation technique [partial differential equations representing both space and time], and physical phenomena, which may be relatively simple to describe over a space dimension, might be too difficult to capture in a bulk representation to the degree of accuracy required.

In this embodiment the user defined extra-Bio-Transport relations are not affected by any changes in state, including those changes produced by the extra-Bio-Transport relations themselves.

In the case of the brain, it appears intuitive that the latest value for a concentration of a chemical/biological or other condition within the brain itself will create signals that move through the CNS and produce an effect in the organism at some distance from the brain in the next time step. While this image is useful in teaching, one skilled in the art will realize that the computed effect might be more accurately applied to the n+rth step instead of the n+1th to account for delay in the CNS transmission in the case of millisecond time steps. On the other hand, the user selected time step may be so large as to have the effect manifested "instantaneously," causing a forward differences approach to accumulate a significant error after a relatively small number of time steps. There are techniques well known to those skilled in the art to reduce the cumulative error. As noted elsewhere, the order of application of the models in this embodiment is to aid in teaching and is not meant to limit the scope of the invention. The use of explicit relationships in this embodiment and use of the CNS as an example is to facilitate the teaching and is not meant to limit the scope of the invention. It is anticipated that users will employ the RPE to incorporate a wide variety of physical relationships within organisms. It is also anticipated that extensions to the RPE will include the ability to deal with implicit relationships and the ability to incorporate certain of these user specified relationships into the built-in models, thereby increasing realism and/or improving the accuracy and speed of solutions.

The Extra-Bio-Transport Model is the last one processed within a time step in this embodiment of the Bio-Transport system simulator. When RPE is finished processing all the user specified extra-Bio-Transport relationships, the process either continues at the start of the time step loop, i.e. at the Fluid Flow Model via Block 912 for another time step, depending on user data 907, or the process is ended and various output displays can be selected by the user in Motion Display.

What is claimed is:

1. A method of simulating a bio-transport system comprising:
   characterizing a plurality of elements to represent a bio-transport system of at least a portion of an organism;
   configuring a simulation model by constructing a plurality of mathematical representations that model bio-transport dynamics for each element based on the characterization of said elements, wherein said bio-transport dynamics include at least:
      flow of a fluid in said bio-transport system, the flow at a particular element being modeled by a first mathematical representation which at least conserves momentum and conserves energy of essentially all of said elements; and
      concentration of at least one entity within said fluid, the concentration of said entity at a particular element being modeled by a second mathematical representation which is a function of flow as determined by said first mathematical representation, and of concentration of said entity in essentially all of said elements;
   initializing the configured simulation model; executing said configured simulation model to obtain bio-transport dynamics data for one or more elements, wherein bio-transport dynamics data comprises at least flow data of said fluid at a particular element, and concentration data of said entity in said fluid at a particular element; and
   outputting information to a user based on at least a portion of said bio-transport dynamics data.

2. The method of claim 1, wherein characterizing one or more elements is performed using data obtained from imaging equipment.

3. The method of claim 1, further comprising:
   exchanging bio-transport dynamics data between one or more organ models.

4. The method of claim 3, wherein bio-transport dynamics data is exchanged between two or more organ models via said configured simulation model.

5. The method of claim 4, wherein one or more organ models are interfaced to said configured simulation model via a telecommunication link.

6. The method of claim 1, wherein an element is characterized to represent at least a portion an organ.

7. The method of claim 1, wherein said bio-transport system is a subsystem of an organ and said configured simulation model is an object in an organ model modeling said organ.

8. The method of claim 1, wherein said bio-transport system is a subsystem of a cell and said simulation model is an object in a cell simulation model modeling said cell.

9. The method of claim 1, wherein additional bio-transport dynamics are selected from the group consisting of heat transport in the fluid, external dynamic and mechanical effects on the fluid, effects at a distance, and combinations of two or more thereof.

10. The method of claim 9, wherein effects at a distance are simulated using a relations processing engine.

11. The method of claim 9, wherein heat transport in the fluid at a particular element is modeled by a third mathematical representation which is a function of flow as determined by said first mathematical representation, and of heat transport in essentially all of said elements, and wherein external dynamical and mechanical effects on the fluid at a particular element is modeled by a fourth mathematical representation which is a function of flow as determined by said first mathematical representation, and of external dynamical and mechanical effects on the fluid in essentially all of said elements.

12. The method of claim 1, wherein at least one element is characterized as having a condition of state.

13. The method of claim 1, wherein a plurality of elements are characterized to model multilevel branching.

14. The method of claim 1, wherein initializing said simulation model comprises entering prime mover data and/or input/output conditions of said bio-transport system.

15. The method of claim 14, wherein prime mover data represents a function of time and state.

16. The method of claim 15, wherein said flow is a function of an element's position relative to said prime mover and the state condition of said prime mover.

17. The method of claim 1, wherein each element is an object in object-oriented programming environment.

18. The method of claim 1, wherein said bio-transport system is a circulatory system.

19. The method of claim 1, wherein said information is used for diagnostic purposes.

20. The method of claim 1, wherein said information is used for determining drug dissemination in a circulatory system as a function of time and position within a circulatory system.

21. The method of claim 1, wherein said configured simulation model incorporates conditions of state relationships in an overall set of relationships to be solved during execution of the configured simulation model.

22. The method of claim 1, wherein the mathematical relationships of one or more bio-transport dynamics are interrelated such that the output of one relationship is used as the input to at least another relationship.

23. The method of claim 1, wherein said configured simulation model comprises at least two simulation models.

24. The method of claim 1, wherein said bio-transport system has a prime mover which generated head, and wherein the flow at said particular element is based upon the sum of the fluid flow pressure drops through each element equals said head of said prime mover.

25. The method of claim 1, wherein said fluid is blood and said entity comprises at least one of plasma, blood cells, a clot, a chemical element, a chemical compound, a product of the immune system, a parasite, or a biological.

26. The method of claim 1, wherein said chemical compound is at least one of a drug, protein, amino acid, hormone or enzyme, said biologicals is at least one of a virus or bactterium, and said product of the immune system is at least one of a macrophage or a t cell.

27. The method of claim 1, wherein said second mathematical relationship is based on at least one of said mass transportation of said entity, chemical/biological interactions of said enetity, or a combination thereof.

28. The method of claim 27, wherein said second mathematical relationship considers changes in mass brought about by said chemical/biological interactions.

29. The method of claim 1, wherein a particular bio-transport dynamic at a particular element is a function of said particular bio-transport dynamic at essentially all of the elements.

30. A method of simulating a transport system comprising: providing a constructed simulation model comprising:
    a plurality of elements characterized to represent at least a portion of a bio-transport system;
    at least one model having one or more mathematical representations of one or more bio-transport dynamics for each element, said mathematical representations being constructed based on the characterization of said elements, wherein said bio-transport dynamics include at least:
        flow of a fluid in said bio-transport system, the flow at a particular element being modeled by a first mathematical representation which at least conserves energy of essentially all of said elements; and
        concentration of at least one entity within said fluid, the concentration of said entity at a particular element being modeled by a second mathematical representation which is a function of flow as determined by said first mathematical representation, and of concentration of said entity in essentially all of said elements; initializing said constructed simulation model;
    executing said configured simulation model to obtain bio-transport dynamics data for one or more elements, wherein said bio-transport dynamics data comprises at least flow data of said fluid at a particular element, and concentration data of said entity in said fluid at a particular element; and
    outputting information to a user based on at least a portion of said bio-transport dynamics data.

31. A computer system for simulating a transport system comprising:
    a processor;
    a user interface operatively connected to the processor for receiving input from and conveying output to a user; and
    memory operatively connected to the processor and containing instructions for constructing and/or executing the simulation model;
        wherein constructing said simulation model comprises
            (a) receiving construction data characterizing a plurality of elements to represent a bio-transport system or a portion thereof;
            (b) constructing one or more mathematical representations that model bio-transport dynamics for each element based on the data characterizing said element to form a configured simulation model, wherein said bio-transport dynamics include at least:
                flow of a fluid in said bio-transport system, the flow at a particular element being modeled by a first mathematical representation which at least conserves momentum and conserves energy of essentially all of said elements; and
                concentration of at least one entity within said fluid, the concentration of said entity at a particular element being modeled by a second mathematical representation which is a function of flow as determined by said first mathematical representation, and of concentration of said entity is essentially all of said elements; and
        wherein executing said simulation model comprises (a) initialing said configured simulation model; and (b) executing said configured simulation model to obtain bio-transport dynamic data for one or more elements, wherein said bio-transport dynamics data comprises at least flow data of said fluid at a particular element, and concentration data of said entity in said fluid at a particular element.

32. A computer-readable medium comprising: instructions for enabling a computer-based system to construct and/or execute the simulation model;
    wherein construction said simulation model comprises (a) receiving data characterizing a plurality of elements to represent a bio-transport system or a portion thereof; (b) constructing one or more mathematical representations that model bio-transport dynamics for each element based on the data characterizing said elements to form a configured simulation model,
    wherein said bio-transport dynamics include at least:
        flow of a fluid in said bio-transport system, the flow at a particular element being modeled by a first mathematical representation which at least conserves momentum and conserves energy of essentially all of said elements; and
        concentration of at least one entity within said fluid, the concentration of said entity at a particular element being modeled by a second mathematical representation which is a function of flow as determined by said first mathematical representation, and of concentration of said entity in essentially all of said elements; and
    wherein executing said simulation model comprises (a) initialing said configured simulation model; and (b) executing said configured simulation model to obtain bio-transport dynamic data for one or more elements, wherein said bio-transport dynamics data comprises at least flow data of said fluid at a particular element, and concentration data of said entity in said fluid at a particular element.

* * * * *